(12) United States Patent
Tsuboi et al.

(10) Patent No.: US 8,793,121 B2
(45) Date of Patent: *Jul. 29, 2014

(54) INFORMATION PROCESSING APPARATUS, NATURAL LANGUAGE ANALYSIS METHOD, PROGRAM AND RECORDING MEDIUM

(75) Inventors: Yuta Tsuboi, Kanagawa-ken (JP); Yuya Unno, Kanagawa (JP)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/599,588

(22) Filed: Aug. 30, 2012

(65) Prior Publication Data

US 2013/0060562 A1     Mar. 7, 2013

Related U.S. Application Data

(63) Continuation of application No. 13/406,709, filed on Feb. 28, 2012.

(30) Foreign Application Priority Data

Mar. 3, 2011    (JP) ................................. 2011-046709

(51) Int. Cl.
   G06F 17/27    (2006.01)
(52) U.S. Cl.
   USPC .......................................................... 704/9
(58) Field of Classification Search
   None
   See application file for complete search history.

(56) References Cited

U.S. PATENT DOCUMENTS

| 5,963,742 A * | 10/1999 | Williams ...................... 717/143 |
| 6,182,026 B1 * | 1/2001 | Tillmann et al. .................. 704/2 |
| 6,332,118 B1 * | 12/2001 | Yamabana ........................ 704/9 |
| 6,760,695 B1 * | 7/2004 | Kuno et al. ...................... 704/9 |
| 7,302,384 B2 * | 11/2007 | Moore .............................. 704/9 |

(Continued)

FOREIGN PATENT DOCUMENTS

| JP | 2001-134575 | 5/2001 |
| JP | 4049141 | 4/2006 |
| JP | 4341077 | 3/2008 |

OTHER PUBLICATIONS

Kilpelainen et al., "Retrieval from hierarchical texts by partial patterns", Proceedings of the 16th annual international ACM SIGIR conference on Research and development in information retrieval, pp. 214-222, 1993.*

(Continued)

*Primary Examiner* — Brian Albertalli
(74) *Attorney, Agent, or Firm* — Jennifer R. Davis; Michael J. Chang, LLC

(57) ABSTRACT

An apparatus and method for calculating a score of matching a sentence with a query pattern having a dependency structure. The apparatus includes: an input unit acquiring an analysis target sentence, a query pattern and an index value indexing how a linguistic unit in the sentence tends to modify another; and a score calculation unit calculating a matching score indexing the degree of matching of the sentence with the query pattern. The matching score is represented by a function having an index value with which a dependency relation included in the query pattern is associated. The score is calculated by attempting association between a substructure of the query pattern and a range in the sentence and by performing recursive calculation in the substructure and the range while storing partial calculation result of the function in a memory area for reuse.

20 Claims, 28 Drawing Sheets

(56) References Cited

U.S. PATENT DOCUMENTS

| | | | |
|---|---|---|---|
| 7,603,267 B2* | 10/2009 | Wang et al. | 704/9 |
| 2011/0082688 A1* | 4/2011 | Kim et al. | 704/9 |
| 2011/0131033 A1* | 6/2011 | Ylonen | 704/9 |

OTHER PUBLICATIONS

Pynadath et al., "Generalized Queries on Probabilistic Context-Free Grammars", IEEE Transactions on Pattern Analysis and Machine Intelligence, vol. 20, Issue 1, pp. 65-77, Jan. 1998.*

Charniak, "Statistical Parsing with a Context-free Grammar and Word Statistics", Proceedings of the fourteenth national conference on artificial intelligence and ninth conference on Innovative applications of artificial intelligence, AAAI'97/IAAI'97, pp. 598-603, 1997.*

Lima et al., "Phrase Recognition and Expansion for Short, Precision-biased Queries based on a Query Log", Proceedings of the 22nd annual international ACM SIGIR conference on Research and development in information retrieval, SIGIR '99, pp. 145-152, 1999.*

V. M. Jiminez et al., "Computation of the n best parse trees . . . ", Advances in Pattern Recognition, Lecture Notes in Computer Science, vol. 1876/2000, 183-192, 2000.

Yaya Unno et al., "Intersegment distance based on marginal probability of dependency", Sixteenth Annual Meeting of the Association for Natural Language Processing, p. 23-26, 2010.

J. M. Eisner, "Three New Probabilistic Models for Dependency Parsing: An Exploration", COLING '96 Proceedings of the 16th conference on Computational linguistics, V. 1, 1996.

* cited by examiner

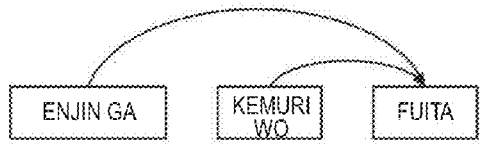
FIG. 2A
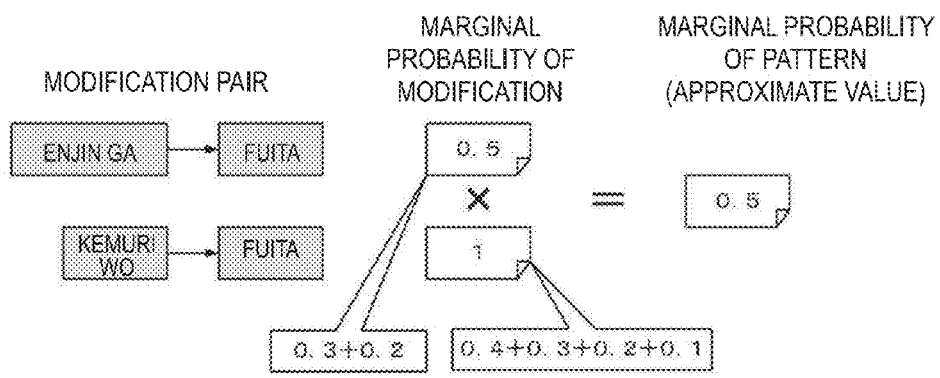
FIG. 2B
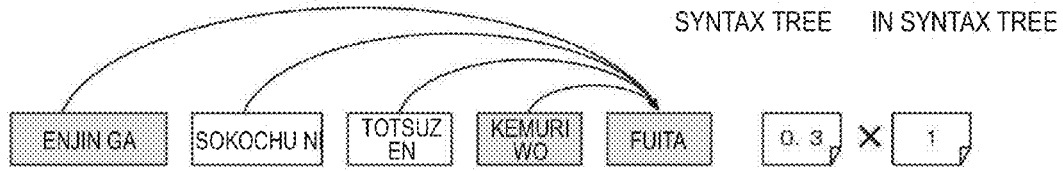
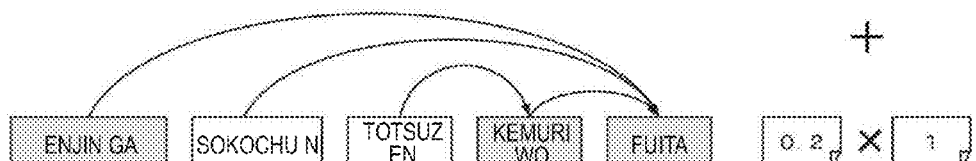
FIG. 2C

```
fun left_seq(n, l, r):
    if n == null:
        return 1
    else if l == r:
        return 0
    else if (n, l, r) in cache:
        return cache_lseq[n, l, r]
    else:
        max = 0
        for i in {l, ..., r-1}:
            if match(n, i):
                s = p(i, r) * left_seq(LCH(n), l, i)
                    * left_link(n, i, r)
                max = max(s, max)
        return cache_lseq[n, l, r] = max
```

FIG. 9A

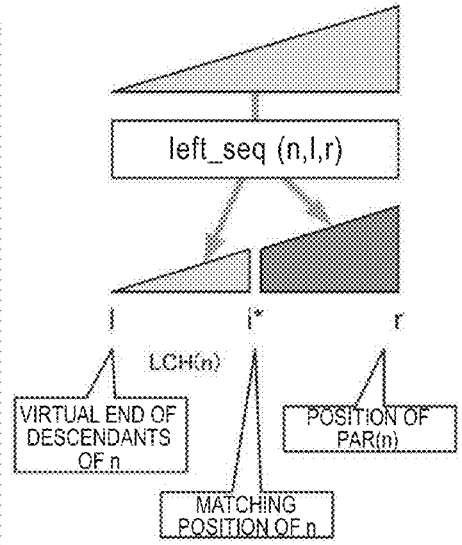

FIG. 9B

```
fun left_link(n, l, r):
    if l == r:
        return 0
    else if (n, l, r) in cache:
        return cache_llink[n, l, r]
    else:
        max = 0
        for i in {l, ..., r-1}:
            s = right_seq(RCH(n), l, i)
                * left_seq(SIB(n), i + 1, r)
            max = max(s, max)
        return cache_llink[n, l, r] = max
```

FIG. 9C

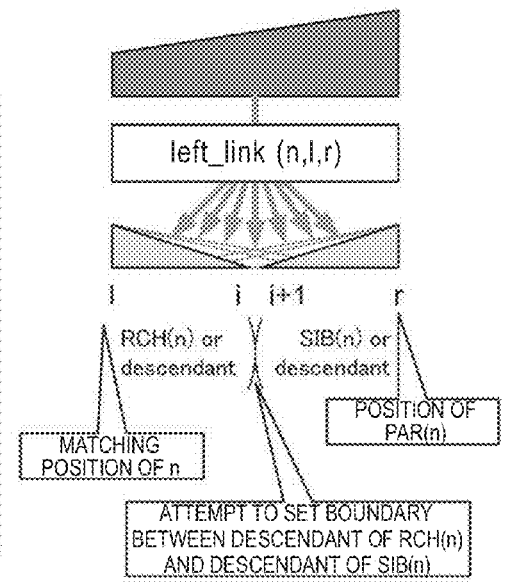

FIG. 9D

```
fun right_seq(n, l, r):
    if n == null:
        return 1
    else if l == r:
        return 0
    else if (n, l, r) in cache:
        return cache_rseq[n, l, r]
    else:
        max = 0
        for i in {l+1, ..., r}:
            if match(n, i):
                s = p(i, l) * right_seq(RCH(n), i, r)
                    * right_link(n, l, i)
                max = max(s, max)
        return cache_rseq[n, l, r] = max
```

FIG. 10A

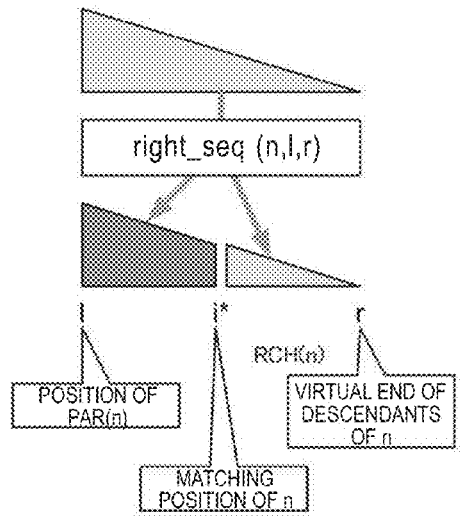

FIG. 10B

```
fun right_link(n, l, r):
    if l == r:
        return 0
    else if (n, l, r) in cache:
        return cache_rlink[n, l, r]
    else:
        max = 0
        for i in {l, ..., r-1}:
            s = left_seq(LCH(n), i+1, r)
                * right_seq(SIB(n), l, i)
            max = max(s, max)
        return cache_rlink[n, l, r] = max
```

FIG. 10C

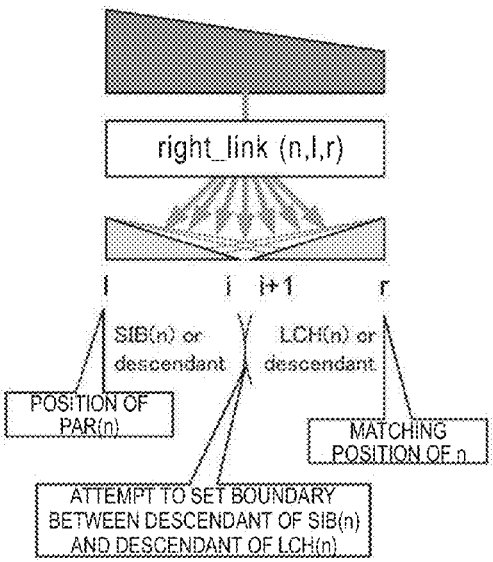

FIG. 10D

```
fun left_seq_e(n, l, r):
    if n == null:
        return 1
    else if l == r:
        return 0
    else if (n, l, r) in cache_lseq_e:
        return cache_lseq_e[n, l, r]
    else:
        sum = 0
        for i in {l, ... ,r-1}:
            if match(n, i):
                sum += f(i, r) * left_match_e(n, i, r)
                    * left_seq_e(LCH(n), l, i)
            sum += f(i, r) * left_link_e(n, i, r)
                    * left_seq_e(null, l, i)
        return cache_lseq_e[n, l, r] = sum
```

FIG. 22A

```
fun left_link_e(n, l, r):
    if n == null:
        return 1
    else if (n, l, r) in cache_llink_e:
        return cache_llink_e[n, l, r]
    else:
        sum = 0
        for i in {l, ... ,r-1}:
            sum += right_seq_e(null, l, i)
                * left_seq_e(n, i+1, r)
        return cache_llink_e[n, l, r] = sum
```

FIG. 22B

```
fun left_match_e(n, l, r):
    if (n, l, r) in cache_lmatch_e:
        return cache_lmatch_e[n, l, r]
    else:
        sum = 0
        for i in {l, ... ,r-1}:
            sum += right_seq_e(RCH(n), l, i)
                * left_seq_e(SIB(n), i+1, r)
        return cache_lmatch_e[n, l, r] = sum
```

FIG. 22C

```
fun right_seq_e(n, l, r):
    if n == null:
        return 1
    else if l == r:
        return 0
    else if (n, l, r) in cache_rseq_e:
        return cache_rseq_e[n, l, r]
    else:
        sum = 0
        for i in {l+1,..., r}:
            if match(n, i):
                sum += f(i, l) * right_match_e(n, l, i)
                    * right_seq_e(RCH(n), i, r)
                sum += f(i, l) * right_link_e(n, l, i)
                    * right_seq_e(null, i, r)
        return cache_rseq_e[n, l, r] = sum
```

FIG. 23A

```
fun right_link_e(n, l, r):
    if n == null:
        return 1
    else if (n, l, r) in cache_rlink_e:
        return cache_rlink_e[n, l, r]
    else:
        sum = 0
        for i in {l+1, ... ,r}:
            sum += left_seq_e(null, i+1, r)
                * right_seq_e(n, l, i)
        return cache_rlink_e[n, l, r] = sum
```

FIG. 23B

```
fun right_match_e(n, l, r):
    if (n, l, r) in cache_rmatch_e:
        return cache_rmatch_e[n, l, r]
    else:
        sum = 0
        for i in {l+1, ... ,r}:
            sum += left_seq_e(LCH(n), i+1, r)
                * right_seq_e(SIB(n), l, i)
        return cache_rmatch_e[n, l, r] = sum
```

FIG. 23C

INFORMATION PROCESSING APPARATUS, NATURAL LANGUAGE ANALYSIS METHOD, PROGRAM AND RECORDING MEDIUM

CROSS REFERENCE TO RELATED APPLICATION

This application is a continuation of and claims priority from U.S. patent application Ser. No. 13/406,709, filed Feb. 28, 2012, which in turn claims priority under 35 U.S.C. 119 from Japanese Application 2011-046709, filed Mar. 3, 2011, the entire contents of both are incorporated herein by reference.

BACKGROUND OF THE INVENTION

1. Field of the Invention

The present invention relates to a natural language analysis technique, and in particular to an information processing apparatus for calculating a score of matching of a sentence with a query pattern having a dependency structure, a natural language analysis method, a program and a recording medium.

2. Description of Related Art

Recently, with the development of information processing techniques, such as those used by computers and the Internet, an enormous amount of atypical text information is being generated, and utilization of such text information is growing in importance. For a sentence in a natural language such as Japanese or English, it is possible to presume a semantic dependency structure among the words by dividing the sentence into words by morpheme analysis and performing dependency syntax analysis. Recently, there has been increasing demand to extract a particular reputation expression from reputation information and the like about a product or extract a characteristic expression about a technique. In light of this, there is now a demand to develop a technique capable of performing highly accurate information searches and information extractions in consideration of not only whether a particular word exists, but also a dependency structure which is a higher semantic expression.

In such extraction, there is, however, a possibility that extract omission is caused due to a dependency syntax analysis error itself. For a sentence written in a natural language, multiple interpretable syntax trees exist for one sentence due to the ambiguity specific to natural languages. Therefore, dependency syntax analysis frequently causes occurrence of an analysis error in comparison with morpheme analysis and the like. Though the analysis accuracy of each Bunsetsu phrase is about 90%, the accuracy of the whole dependency structure being correctly analyzed is lower. In a simple trial calculation, the analysis accuracy in the case of a pattern including two dependency relations is about 81%, and it decreases to about 73% if three dependency relations are included.

As prior-art techniques for performing an information search and extraction in consideration of a dependency structure, there are known approaches called a 1-best method, an N-best method and intrasentential co-occurrence. The 1-best method is a method in which pattern matching is performed for the best syntax analysis result for a sentence showing the highest score. The N-best method is a method in which: N high-score syntax analysis results for a sentence are acquired; pattern matching is performed for the N syntax analysis results; and, if there is any syntax analysis result that matches the pattern, it is determined that the pattern is matched (V. M. Jimenez, A. Marzal, "Computation of the n best parse trees for weighted and stochastic context-free grammars", Advances in Pattern Recognition, Lecture Notes in Computer Science, Volume 1876/2000, 183-192, 2000). The intrasentential co-occurrence is an approach in which matching is performed for a sentence depending on whether multiple words co-occur or not. Non Patent Literature 2 (Yuya Unno, Yuta Tsuboi, "Intersegment distance based on marginal probability of dependency", Collection of Papers of The Sixteenth Annual Meeting of The Association for Natural Language Processing, pp. 23-26, March, 2010) discloses an approach for calculating an expected value of a distance on a dependency tree for the purpose of robustly performing information extraction from the dependency tree. In addition, for example, Japanese Patent No. 4049141, Japanese Patent No. 4341077, Japanese Patent Laid-Open No. 2001-134575 are known as prior-art techniques related to tree-structure pattern extraction.

BRIEF SUMMARY OF THE INVENTION

In order to overcome these deficiencies, the present invention provides an information processing apparatus calculating a score of matching a sentence with a pattern, including: an input unit receiving as inputs a sentence to be analyzed, an index value indexing how a linguistic unit in the sentence tends to modify another, and a query pattern; and a score calculation unit calculating a matching score indexing the degree of matching of the sentence with the query pattern, the matching score being represented by a function having at least a variable, the variable being an index value with which a dependency relation included in the query pattern is associated; wherein the score calculation unit calculates the score by attempting association between a substructure of the query pattern and a range in the sentence and performing recursive calculation in the substructure and the range while storing a partial calculation result of the function in a memory area for reusing the result.

According to another aspect, the present invention provides an information processing apparatus calculating a score of matching of a sentence with a pattern, including: an input unit receiving as inputs a sentence to be analyzed, a marginal probability of dependency between linguistic units, and a query pattern; and a score calculation unit calculating a marginal probability of pattern of a candidate having the query pattern as a subtree being generated among analysis candidates of the sentence as the score, the marginal probability of pattern being represented by a function of the marginal probability of dependency with which each dependency relation specified in the query pattern is associated; wherein the score calculation unit calculates the marginal probability of pattern by attempting association between a substructure of the query pattern and a range in the sentence and performing recursive calculation inside the substructure and the range while storing a partial calculation result of the function in a memory area for reusing the result.

According to yet another aspect, the present invention provides a natural language analysis method for calculating a score of matching of a sentence written in a natural language with a pattern having a dependency structure, including: receiving as inputs a sentence to be analyzed, an index value indexing how a linguistic unit in the sentence tends to modify another, and a query pattern; storing the inputs in a storage area; and calculating a matching score indexing the degree of matching of the sentence with the query pattern by a processor.

The matching score is represented by a function having at least a variable, the variable being an index value with which a dependency relation included in the query pattern is associated.

Further, the step of calculating includes a step of recursively calling a substep of attempting association between a substructure of the query pattern and a range in the sentence and performing a calculation while storing a partial calculation result of the function in a memory area for reusing the result in the substructure and the range.

BRIEF DESCRIPTION OF THE SEVERAL VIEWS OF THE DRAWINGS

FIG. 2 is a diagram illustrating the outline of a matching score calculation method according to an embodiment of the present invention;

FIG. 9 shows (A, B) a pseudo-code of the left sequence function and a conceptual diagram illustrating a recursive call, and (C, D) a pseudo-code and of the left link function and a conceptual diagram illustrating a recursive call in the first embodiment of the present invention;

FIG. 10 shows (A, B) a pseudo-code of a right sequence function and a conceptual diagram illustrating a recursive call, and (C, D) a pseudo-code and of a right link function and a conceptual diagram illustrating a recursive call in the first embodiment of the present invention;

FIG. 22 is a diagram illustrating pseudo-codes of (A) the left sequence function, (B) the left link function and (C) the left matching function in the second embodiment of the present invention;

FIG. 23 is a diagram illustrating pseudo-codes of (A) the right sequence function, (B) the right link function and (C) a right matching function in the second embodiment of the present invention;

DETAILED DESCRIPTION OF THE PREFERRED EMBODIMENTS

The present invention will be described below with embodiments. The present invention is not limited to the embodiments to be described later. In the embodiments described below, a computer apparatus that calculates a score of matching of a sentence with a query pattern will be described as an example.

Explanation of Technical Terms

Figure 1:
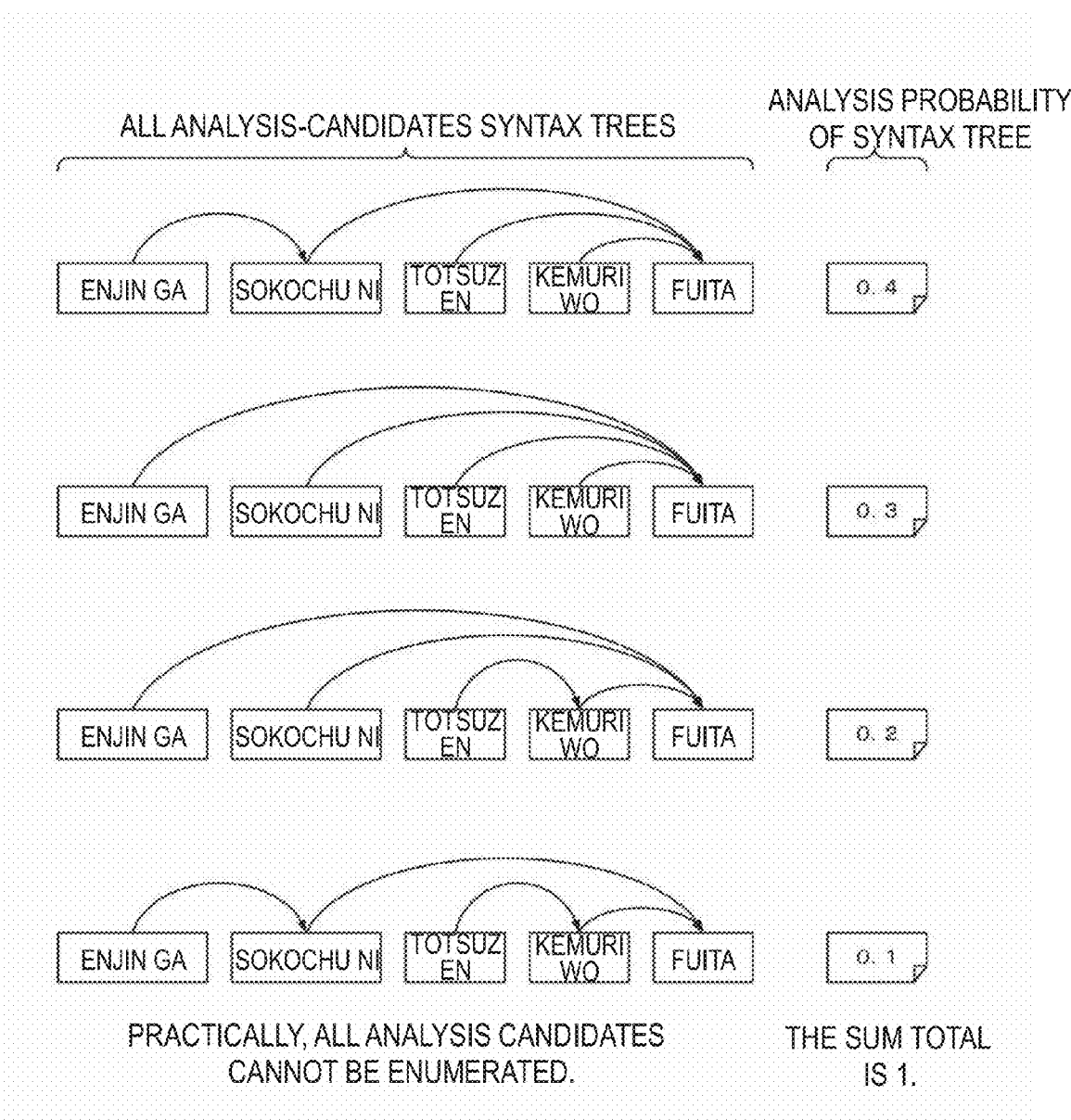
FIG. 1 is a diagram illustrating a result of statistical dependency syntax analysis.

First, technical terms to be used in embodiments of the present invention will be described below. FIG. 1 is a diagram illustrating a result of statistical dependency syntax analysis. FIG. 1 schematically shows an analysis result in the case of performing dependency syntax analysis of an analysis target sentence: "Enjin ga/sokochu ni/totsuzen/kemuri wo/fuita" ("The engine suddenly emitted smoke during traveling"). A preprocessing technique, such as morpheme analysis, has been performed for the analysis target sentence in advance, and the analysis target is given as a string of words or a string of segments. (Both of a "word" and a "segment" are language units which are different from a sentence. Though description will be made below with a segment as a language unit, as an example, a word or segment can be selected according to the language or arbitrarily.)

"Analysis candidate" refers to, in statistical (stochastic) dependency syntax analysis of an analysis target sentence given as a string of segments, a syntax tree which can exist for the sentence. FIG. 1 illustrates four analysis candidate syntax trees for convenience. Analysis candidates, however, include all syntax trees that can exist for a sentence, and the number increases exponentially according to the sentence length (the number of segments). "Analysis probability of an analysis candidate" refers to a probability given to an analysis candidate syntax tree when statistical dependency syntax analysis is executed for a sentence. The analysis probability of each analysis candidate is normalized so that the sum total of the analysis probabilities of all analysis candidates is 1.

"Marginal probability of dependency" refers to a marginal probability indexing dependency tendency between segments in a sentence, and it substantially agrees with a sum total of analysis probabilities of all syntax-tree analysis candidates that include a dependency pair. The marginal probability of dependency of a dependency pair of the i-th and j-th segments in a sentence as a dependency source and a dependency destination, respectively, is represented by $p(i, j)$. It is actually difficult to enumerate all analysis candidates that include a certain dependency pair. If it is assumed that all analysis candidates are enumerated in FIG. 1, the marginal probability of dependency of the dependency pair "Enjin ga→fuita" ("The engine→emitted") in the sentence "Enjin ga/sokochu ni/totsuzen/kemuri wo/fuita" is the sum total of the analysis probabilities of the second and third candidates in which this dependency pair appears (0.3+0.2=0.5). Similarly, the marginal probability of dependency of the dependency pair "kemuri wo→fuita" ("emitted→smoke") is the sum total of the analysis probabilities of the first to fourth analysis candidates in which this dependency pair appears (0.4+0.3+0.2+0.1=1.0). It is known that the marginal probability of dependency can be calculated by applying dynamic programming.

"Marginal probability of pattern" refers to a marginal probability of an analysis candidate syntactic tree which includes a pattern as a subtree being generated among all analysis candidates. In the embodiments of the present invention, it can be used as a score of matching of a sentence with a query pattern. The "marginal probability of pattern" substantially agrees with the sum total of analysis probabilities of syntax tree analysis candidates which include a pattern as a subtree among all analysis candidates. In the example shown in FIG. 1, the marginal probability of pattern of the pattern "Enjin ga→fuita; kemuri wo→fuita" in the sentence "Enjin ga/sokochu ni/totsuzen/kemuri wo/fuita" is the sum total of the analysis probabilities given to the second and third analysis candidates in which this pattern appears (0.3+0.2=0.5). The marginal probability of pattern takes a real number from 0 to 1.

It is realistically difficult to enumerate all analysis candidates, determine whether each candidate matches a pattern or not, and takes a sum total of the analysis probabilities of candidates that match the pattern. According to a first embodiment of the present invention described below, however, it is possible to efficiently perform approximate calculation of a marginal probability of pattern without enumerating all the analysis candidates. In the first embodiment of the present invention, in order to determine a marginal probability of pattern which can be handled as a probability without enumerating all analysis candidates, the marginal probability of pattern is approximated by the product of marginal probabilities of dependency of dependency pairs involved in matching. FIG. 2 is a diagram illustrating the outline of a matching score calculation method according to an embodiment of the present invention. FIG. 2(A) illustrates a query pattern having a dependency structure, and FIG. 2(B) is a diagram illustrating approximate calculation of a marginal probability of pattern according to the first embodiment of the present invention.

In the example shown in FIG. 2, the marginal probability of pattern of the pattern "Enjin ga→fuita; kemuri wo→fuita" in the sentence "Enjin ga/sokochu ni/totsuzen/kemuri wo/fuita" can be approximately calculated as the product of the marginal probabilities of dependency of the dependency pairs of "Enjin ga→fuita" and "kemuri wo→fuita" involved in matching (0.5×1=0.5). The marginal probabilities of dependency of the dependency pairs "Enjin ga→fuita" and "kemuri wo→fuita" are the sum total of the analysis probabilities given to the second and third analysis candidates in which the dependency pair appears (0.3+0.2=0.5) and the sum total of the analysis probabilities given to the first to fourth analysis candidates (0.4+0.3+0.2+0.1=1.0), respectively, as described above, and these can be calculated by an existing technique.

"Expected value of the number of pattern appearances" refers to an expected value of the number of times a pattern appears in all analysis candidates. In the embodiments of the present invention, it can be used as a score of matching of a sentence with a query pattern. The "expected value of the number of pattern appearances" substantially agrees with the sum total of products for all analysis candidates, the product being the product of the total number of patterns appearing in each analysis candidate syntactic tree and the analysis probability of the syntactic tree. In the example shown in FIG. 1, the expected value of the number of pattern appearances of the pattern "Enjin ga→fuita; kemuri wo→fuita" in the sentence "Enjin ga/sokochu ni/totsuzen/kemuri wo/fuita" is the sum total of products for all analysis candidates, the product being the product of analysis probability of each candidate and the number of appearances in the candidate (0.4×0+0.3×1+0.2×1+0.1×0=0.5).

It is realistically difficult to enumerate all analysis candidates, calculate the number of times a pattern appears in the each candidate, determine the product of the number of appearances in the candidate and the analysis probability and take a sum total of the products for all analysis candidates. According to a second embodiment of the present invention described below, however, it is possible to efficiently perform calculation of the expected value of the number of pattern appearances without enumerating all analysis candidates. FIG. 2(C) is a diagram illustrating a method for calculating the expected value of the number of pattern appearances according to the second embodiment of the present invention. In the example shown in FIG. 2(C), the number of appearances in analysis candidate syntax trees in which the pattern of "Enjin ga→fuita; kemuri wo→fuita" appears is counted up, and the expected value of the number of pattern appearances can be calculated as a sum total of products for the analysis candidate syntax trees, the product being the product of the analysis probability of each analysis candidate in which the pattern appears and the number of appearances in the analysis candidate (0.3×1+0.2×1=0.5).

In the example shown in FIG. 1, the number of appearances is "1" in both of the second and third candidates. Therefore, the expected value of the number of pattern appearances in the example agrees with the marginal probability of pattern. However, multiple appearances in an analysis candidate is also conceivable. In such a case, there is a possibility that the expected value of the number of pattern appearances is equal to or larger than 1. For example, a case will be considered in which a query pattern "Bucho . . . hatsugen . . . [verb]" ("Manager . . . stated (statement) . . . [verb]") is given to a sentence "A bucho wa, B bucho ga hatsugen shita kotoni kanshite hatsugen shita" ("Manager A made a statement about what Manager B had stated"). In this case, in the first embodiment in which the marginal probability of pattern described above is used as a matching score, the marginal probability of a position with the highest appearance frequency is calculated, and the larger value of the marginal probability in the case of associating the pattern with "A bucho . . . hatsugen shita" ("Manager A . . . made a statement") or the marginal probability in the case of associating the pattern with "B bucho . . . hatsugen shita" ("Manager B . . . made a statement") is returned. In comparison, in the second embodiment in which the expected value of the number of pattern appearances described above is used as a matching score, both of "A bucho . . . hatsugen shita" and "B bucho . . . hatsugen shita" are counted, and the expected value can be more than one. The marginal probability of pattern can be more preferably used when the certainty degree of syntax analysis is important, and the expected value of the number of pattern appearances can be more preferably used when merely the number of appearances is important.

In the matching score calculation processes according to the first and second embodiments of the present invention, by applying dynamic programming, the marginal probability of pattern appearances and the expected value of the number of pattern appearances used as a matching score are efficiently calculated, respectively, without enumerating all syntax analysis candidates. The matching score (marginal probability of pattern) calculation process according to the first embodiment will be described below.

First Embodiment

Figure 3:
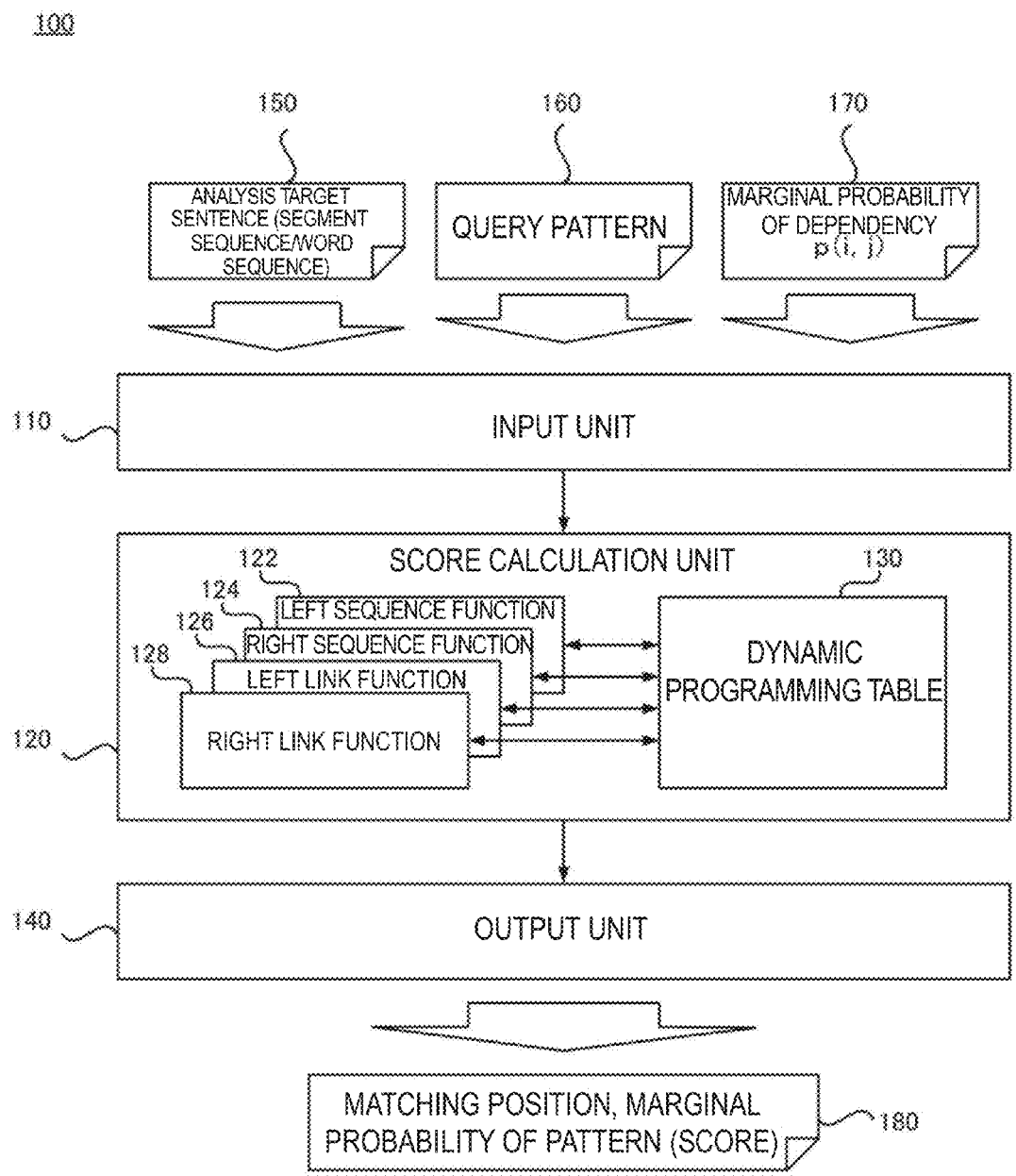
FIG. 3 is a functional block diagram of a computer apparatus according to a first embodiment of the present invention.

A computer apparatus which calculates a score of matching of a sentence with a query pattern according to the first embodiment of the present invention will be described below on the basis of the description of the technical terms above. FIG. 3 shows functional blocks of a computer apparatus 100 according to the first embodiment of the present invention. The computer apparatus 100 shown in FIG. 3 is generally configured as a general-purpose computer such as a personal computer, a workstation or a main frame. The computer apparatus 100 is provided with a CPU (Central Processing Unit), a RAM (Random Access Memory), a storage device such as an HDD (Hard Disk Drive) and/or an SSD (Solid State Drive), and a NIC (Network Interface Card) as needed, which are not shown in FIG. 3, and it operates under the control of an OS such as Windows®, UNIX®, AIX® and Linux®. Each of the functional units (to be described later) shown in FIG. 3 are realized on the computer apparatus 100 by developing a program on a memory which provides a work area for the CPU, executing the program under the control of the CPU and controlling the operations of each hardware resource.

The computer apparatus 100 according to an embodiment of the present invention includes an input unit 110 which acquires input data including an analysis target sentence 150 and a query pattern 160, a score calculation unit 120 which calculates a matching score using the input data, and an output unit 140 which outputs an analysis result including the matching score.

Figures 4A, 4B:
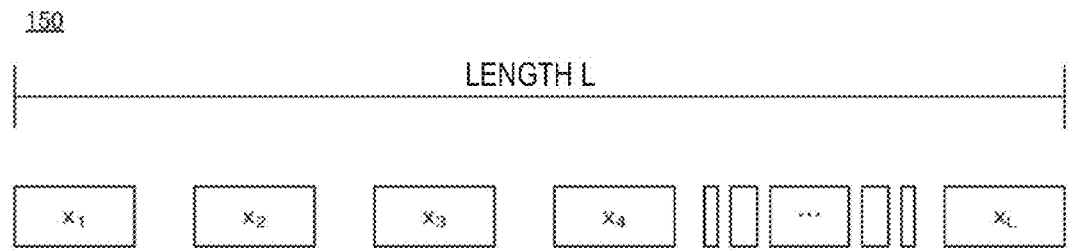
FIG. 4 shows schematic diagrams illustrating (A) an analysis target sentence and (B) a data structure of a marginal probability of dependency in the first embodiment of the present invention.

The analysis target sentence 150 is divided to be a string of words by a character string analysis method such as morpheme analysis at a previous step before being inputted to the input unit 110, and part-of-speech tagging is performed for each word as appropriate. The analysis target sentence 150 is given as a string of words or a string of segments although it depends on the kind of natural language. The analysis target sentence can be a sentence in any natural language, such as Japanese or English. It is basically assumed that a projective dependency relation is handled therein, and one-way and two-way dependency relations are allowed. That is, the present invention is applicable to any language with almost no crossings, and also applicable to a sentence having two-way dependency such as an English sentence. FIG. 4(A) illustrates the analysis target sentence 150, and a segment string $(x_1, x_2, \ldots, x_L)$ with a sentence length L is shown.

In the embodiment of the present invention, a marginal probability of dependency 170 attached to the analysis target sentence 150 and indexing the dependency tendency of each segment pair in the sentence is further given as input data. A marginal probability of dependency from the i-th segment to the j-th segment p(i, j) can be acquired as a result of performing statistical syntax analysis of the sentence in advance. FIG. 4(B) schematically illustrates the data structure of the marginal probability of dependency 170 and shows a table with a dependency source number i as a line and a dependency destination number j as a column. Squares having an area in proportion to the value of the marginal probability of dependency are shown in cells.

The statistical dependency syntax analysis is a dependency syntax analysis approach adopting a statistical approach, and it is a natural language analysis process for solving the problem of identifying a dependency destination word or segment of each word or segment of a given sentence. Mathematically, when an analysis target sentence is represented by a segment string $x=\{x_1, x_2, \ldots x_L\}$ with the use of an element xi indicating the i-th segment (word), a dependency structure by a string $y=\{y_1, y_2, \ldots, y_L\} \in N^L$ with the use of an element $y_i$ indicating a dependency destination index of the i-th segment, and probability variables corresponding to the string of segments and the dependency structure by X and Y, respectively, the 1-best method corresponds to determination of y that maximizes simultaneous distribution $P(Y=y|X=x)$ of Y=y when X=x is given. The N-best method corresponds to determination of N sets of y in descending order of $P(Y=y|X=x)$. J. M. Eisner, "Three New Probabilistic Models for Dependency Parsing: An Exploration", COLING '96 Proceedings of the 16th conference on Computational linguistics, Volume 1, 1996 can be referred to for the details of the statistical syntax analysis.

The query pattern 160 can be represented by a tree structure with a pattern element to be matched with a segment as a node and a dependency relation between pattern elements as an edge. Mathematically, the query pattern 160 can be represented by a pattern string $p=\{p_1, p_2, \ldots, p_M\}$ with a length of M, with the use of an element $p_i$ indicating the i-th pattern element to be matched with a segment. The dependency structure of the query pattern 160 can be represented by a function par(p, i) which returns an index of the parent node (dependency destination) of the pattern element $p_i$. The query pattern 160 can be preferably a subtree of a projective dependency syntax tree, that is, it can be of an ordered tree structure in which child nodes can be defined separately on the right and left. Therefore, it is a condition for matching that the nodes appear in a sentence in the same order from the left to right as the elements in the pattern. A root is virtually set at the top or end of the query pattern, and a tree structure corresponding to a dependency structure is defined with the set root as the apex.

Regarding relations to be defined between nodes, there are: a parent node PAR(n), the nearest left child node LCH(n), the nearest right child node RCH(n) and a sibling node SIB(n) when a node of interest is denoted by n. The nearest left child node LCH(n) is a left-side child node of the node of interest n, which exists on the nearest left side, and the nearest right child node RCH(n) is a right-side child node of the node of interest n, which exists on the nearest right side. The sibling node SIB(n) is a node having the same parent as the node of interest n. When the node of interest n exists on the left side of the parent, the sibling node SIB(n) is a node existing on the right side of the node of interest n. When the node of interest n exists on the right side of the parent, the sibling node SIB(n) is a node existing on the left side of the node of interest n. All dependency structures of the query pattern 160 can be directly or indirectly represented by the parent node PAR(n), the nearest left child node LCH(n), the nearest right child node RCH(n) or the sibling node SIB(n).

Figure 5A:
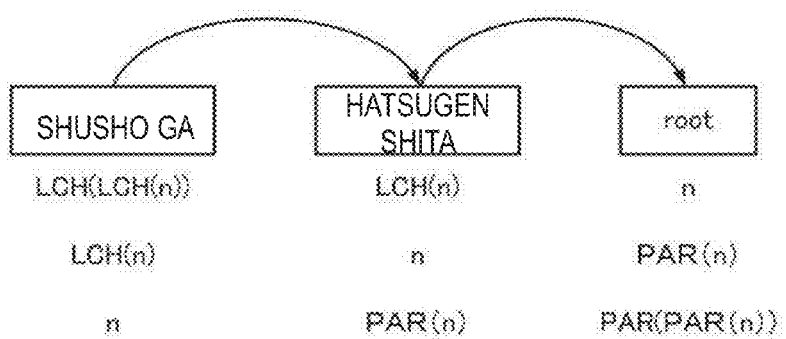
FIG. 5 is a diagram illustrating the data structure of a query pattern in the first embodiment of the present invention.

In a query pattern 160*a* shown in FIG. 5(A), when the root is the node of interest n, the pattern element "hatsugen shita" ("made a statement") is specified as the nearest left child node LCH(n) of the node of interest n, and the pattern element "Shusho ga" ("Prime minister") as the nearest left child node LCH (LCH(n)) of the pattern element "hatsugen shita". When the pattern element "hatsugen shita" is seen as the node of interest n, the parent node PAR(n) of the node of interest n is the root, and the nearest left child node LCH(n) of the node of interest n corresponds to the pattern element "Shusho ga".

Figure 5B:
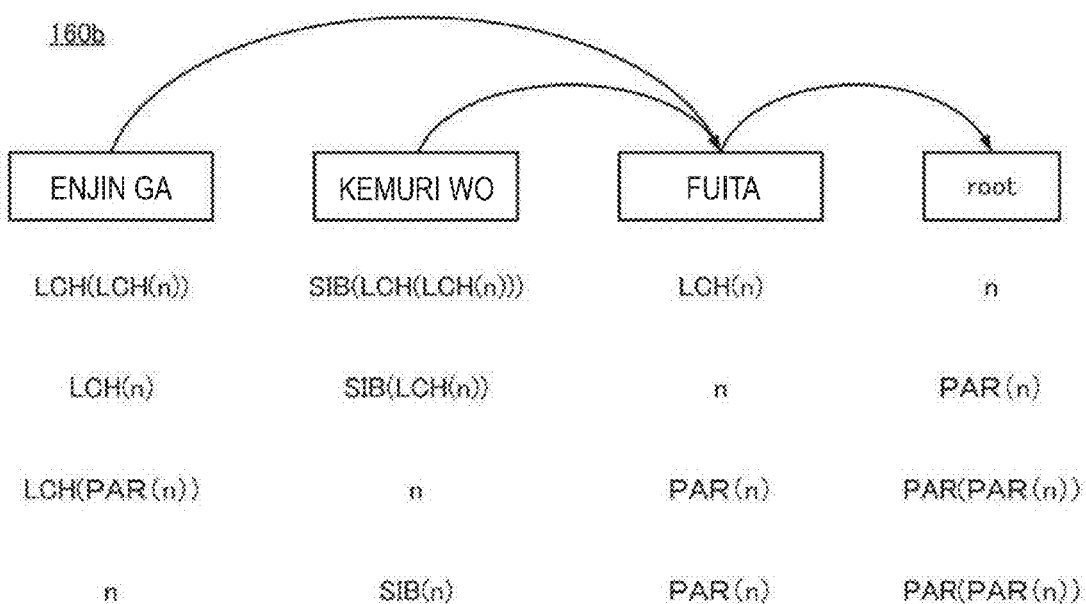

In a query pattern 160*b* shown in FIG. 5(B), when the root is the node of interest n, the pattern element "fuita" ("emitted") is specified as the nearest left child node LCH(n) of the node of interest n, the pattern element "Enjin ga" ("The engine") as the nearest left child node LCH (LCH(n)) of the pattern element "fuita", and the pattern element "kemuri wo" ("smoke") as the sibling node SIB (LCH(LCH(n))) of the pattern element "Enjin ga". When the pattern element "Enjin ga" is seen as the node of interest n, the parent node PAR(n) of the node of interest n corresponds to the pattern element "fuita", and the sibling node SIB(n) of the node of interest n corresponds to the pattern element "kemuri wo".

The pattern element constituting each node of the query pattern 160 can be the character expression of a word or segment itself, such as "Shacho" ("President") or "Enjin ga" described above, or it can be of a normal form or can be a restriction condition on parts of speech such as "verb" and "noun" and other tag information, or a regular expression using a wild card. The pattern element is not especially limited. Here, a pattern matching function $M(x_i, p_j) \in \{0, 1\}$ is defined which outputs "true (1)" if a pattern element $p_j$ matches the i-th segment $x_i$ and outputs "false (0)" if it does not match the i-th segment $x_i$.

Referring to FIG. 3 again, the score calculation unit 120 calculates the score of matching of the analysis target sentence 150 with the query pattern 160 using input data acquired by the input unit 110. As described above, in the first embodiment, the marginal probability of pattern that, among all analysis candidates which can exist for the analysis target sentence 150, a candidate having the query pattern 160 as a subtree is generated is used as a matching score. The marginal probability of pattern is represented by a function of each marginal probability of dependency p(i, j) with which each dependency relation specified in the query pattern 160 is associated. More specifically, it is approximated by the product of marginal probabilities of dependency p(i, j) involved in matching. In this embodiment, a marginal probability of pattern that is globally the highest is calculated in the end by the score calculation unit 120, and the optimum association between the query pattern 160 and the analysis target sentence 150 is determined at the same time.

Mathematically, association can be represented as a matching string $m=\{m_1, m_2, \ldots, m_M\} \in N^M$ with a length of M, with the use of an index $m_i$ of a segment with which the pattern element $p_i$ is to be matched. It is necessary that $M(x_{mi}, p_i)=1$ is satisfied for arbitrary i. In the first embodiment of the present invention, to determine a matching score is to mathematically determine a value expressed by an expression (1) below. In the expression (1) below, V(y, m, p) is a function which returns 1 if the parent of a pattern string p and the parent of a string y indicating a dependency structure agree with each other when the pattern string p is matched with the matching string m. That is, V(y, m, p) returns 1 when $y_{mi}=m_{par(p, i)}$ is satisfied for arbitrary i and is used as a restriction condition for ensuring appropriateness.

Expression 1

$$\max_m\{\Sigma_{y \text{st} V(y,p,m)=1} P(Y=y|X=x)\} \quad (1)$$

Since the above expression (1) cannot be calculated as it is, simultaneous distribution is approximated by the product of marginal probabilities. That is, P(Y=y|X=x) is approximated by the product of marginal probabilities of dependency represented by an expression (2) below.

Expression 2

$$P(Y=y|X=x) \approx P(Y_1=y_1|x)P(Y_2=y_2|x)\ldots P(Y_L=y_L|x) \quad (2)$$

The score calculation unit 120 is provided with a group of functions 122 to 128. By recursively calling the group of the functions 122 to 128, the score calculation unit 120 calculates the marginal probability of pattern described above without enumerating all analysis candidates. More specifically, the score calculation unit 120 attempts association between a substructure of the query pattern 160 and a range in the analysis target sentence 150 using the group of the functions 122 to 128, and recursively calculates a partial calculation result of the product of the marginal probabilities of dependency described above inside the substructure and the range. The partial calculation result once calculated is stored in a dynamic programming table 130. When the partial calculation result is needed again in the calculation process, the value stored in the dynamic programming table 130 is referred to and reused instead of calculating it again. The dynamic programming table 130 is a storage area for storing the partial calculation result, and it is provided, for example, from the storage area of an RAM, HDD, SSD and the like.

The first embodiment of the present invention makes it possible to perform efficient approximate calculation of a marginal probability of pattern, which is, originally, quantitatively difficult to perform, by utilizing the fact that association between a substructure of the query pattern 160 and a range in the analysis target sentence 150 can be mutually recursively treated and applying dynamic programming. In this embodiment, four functions of a left sequence function 122, a right sequence function 124, a left link function 126 and a right link function 128 are defined as the above group of functions. A process by the score calculation unit 120 using the group of functions will be described later in detail.

The output unit 140 outputs a calculation result 180 including a marginal probability of pattern (a matching score) calculated by the score calculation unit 120. In the first embodiment, since an optimum matching string m of the query pattern 160 for the analysis target sentence 150 is also determined when a marginal probability of pattern is calculated, a matching position specified by the matching string m can be also included in the calculation result 180.

Figure 6:
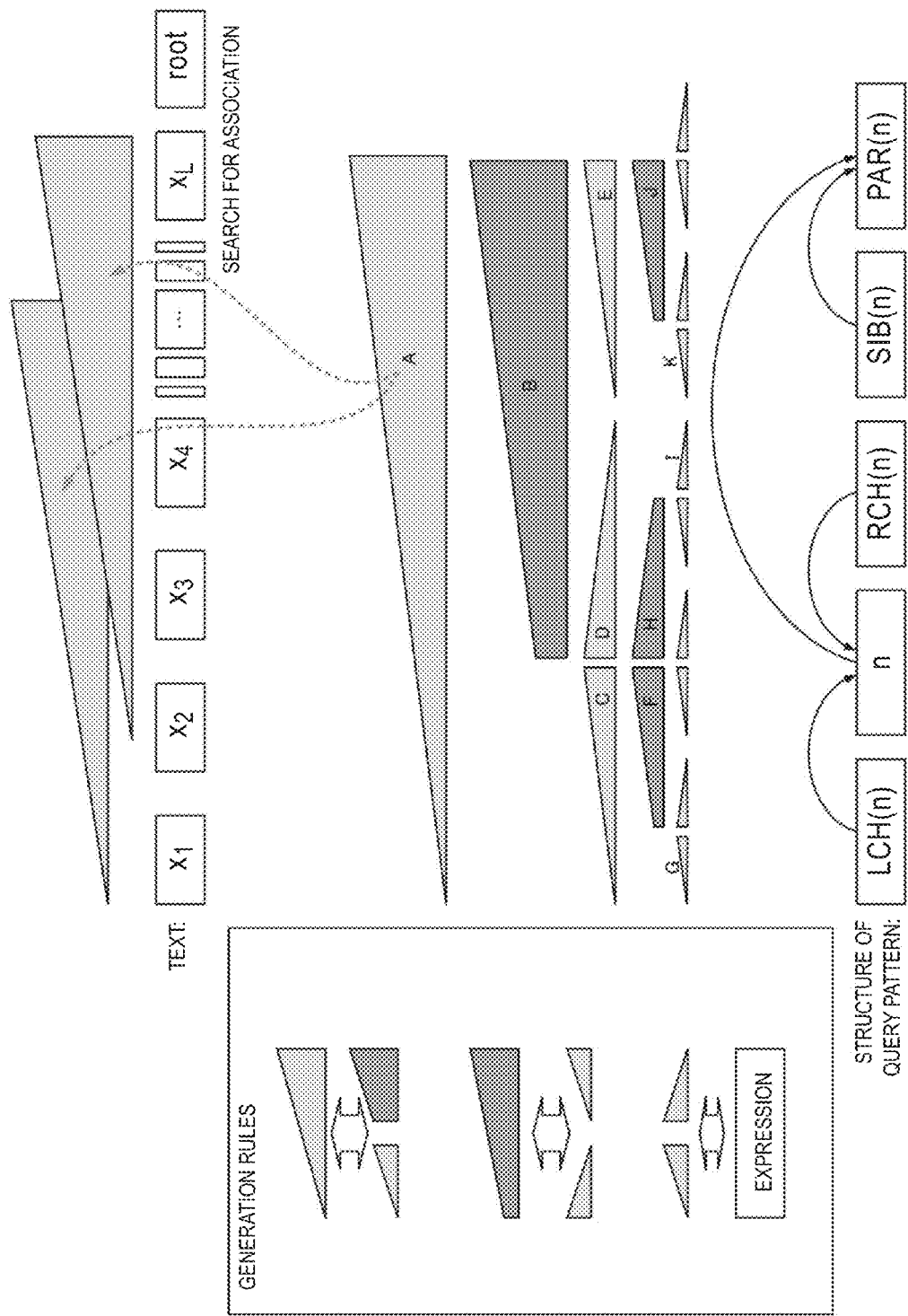
FIG. 6 is a conceptual diagram illustrating a matching score calculation method according to the first embodiment of the present invention.
Figure 7:
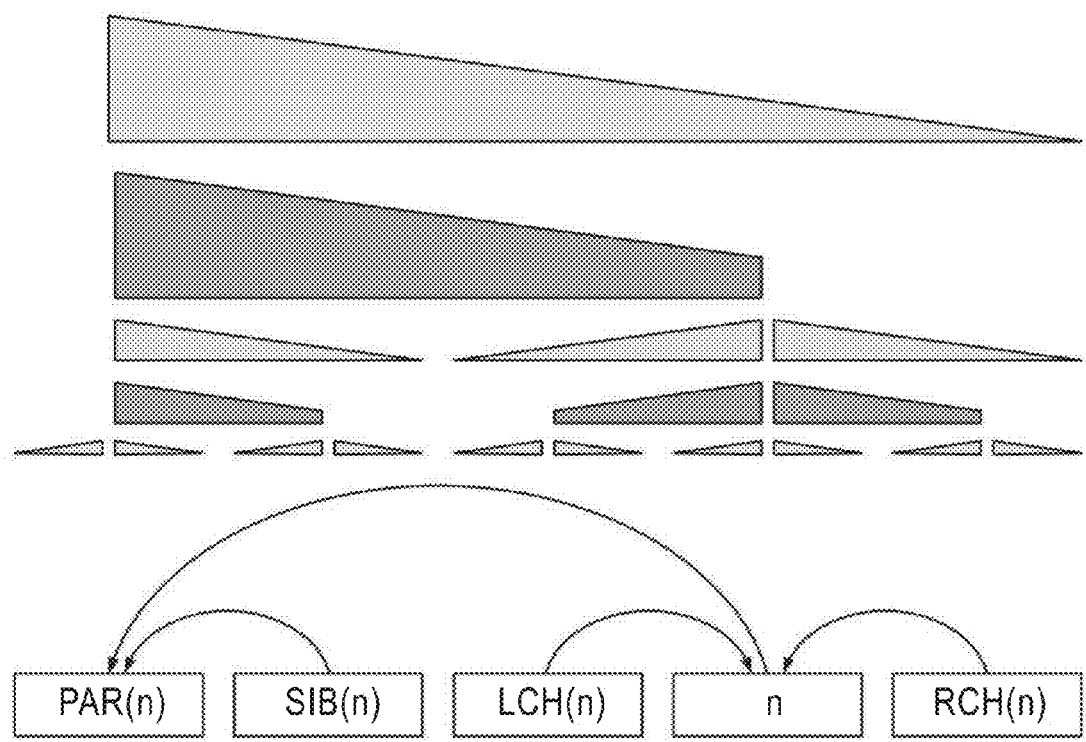
FIG. 7 is a diagram showing a syntax tree of a query pattern in the case where a parent node exists on the left side.

A matching score calculation process according to the first embodiment of the present invention will be described below with reference to FIGS. 6 to 8. FIG. 6 is a diagram conceptually illustrating the matching score calculation method according to the first embodiment of the present invention. In the first embodiment of the present invention, a syntax tree of a query pattern similar to the Eisner syntax tree is assumed. Triangles and trapezoids in FIG. 6 correspond to a complete span indicating a semi-component and an incomplete span indicating dependency relation in the linear Eisner algorithm, respectively. In the embodiment of the present invention, each shape represents a substructure of a query pattern. In the matching score calculation process, optimum association between a substructure represented by each shape and a range (span) in an analysis target sentence is searched for.

In FIG. 6, in relation to a node of interest n of a query pattern, the nearest left child node LCH(n), the node of interest n, the nearest right child node RCH(n), a sibling node SIB(n) and a parent node PAR(n) are arranged in that order. First, on the basis of a third syntax tree generation rule shown in FIG. 6, a pair of a left-pointing triangle and a right-pointing triangle, each of which represents a semi-component, is generated from each of these nodes indicating pattern elements of the query pattern. Then, on the basis of a second syntax tree generation rule shown in FIG. 6, a left-pointing trapezoid F is generated from the right-pointing triangle of the nearest left child node LCH(n) and the left-pointing triangle of the node of interest n. This left-pointing trapezoid F represents a substructure between the nearest left child node LCH(n) and the node of interest n, and represents the relation of dependency from the nearest left child node LCH(n) to the node of interest n. Similarly, from the right-pointing triangle of the node of interest n and the left-pointing triangle of the nearest right child node RCH(n), a right-pointing trapezoid H is generated which represents the relation of dependency from the nearest right child node RCH(n) to the node of interest n. The same goes for a left-pointing trapezoid J representing the relation of dependency from the sibling node SIB(n) to the parent node PAR(n).

Furthermore, on the basis of a first syntax tree generation rule shown in FIG. 6, from the left-pointing triangle G of the nearest left child node LCH(n) and the left-pointing trapezoid F representing the substructure between the nearest left child node LCH(n) and the node of interest n, a left-pointing triangle C representing a substructure between the nearest left child node LCH(n) and the node of interest n is generated. Similarly, a right-pointing triangle D is generated from the right-pointing trapezoid H and the right-pointing triangle I of the nearest right child node RCH(n), and a left-pointing triangle E is generated from the left-pointing triangle K of the sibling node SIB(n) and the generated left-pointing trapezoid J.

Then, on the basis of the second syntax tree generation rule shown in FIG. 6, a left-pointing trapezoid B representing the relation of dependency from the node of interest n to the parent node PAR(n) is generated from the right-pointing triangle D and the left-pointing triangle E. On the basis of the first syntax tree generation rule shown in FIG. 6, a left-pointing triangle A representing a substructure between the nearest left child node LCH(n) and the parent node PAR(n) is further generated from the left-pointing triangle C and the left-pointing trapezoid B. In this way, a syntax tree similar to the Eisner syntax tree is generated with shapes representing the substructures among LCH(n), n, RCH(n), SIB(n) and PAR(n) as nodes.

FIG. 6 shows a substructure of a query pattern with the node of interest n as the center. A more detailed structure is defined according to a concrete query pattern. For example, there may be a case where LCH(LCH(n)), RCH(LCH(n)) and SIB(LCH(n)) are further defined with the nearest left child node LCH(n) as a node of interest or a case where the parent node PAR(PAR(n)) of the parent node PAR(n) is defined. It should be noted that these are not shown. Furthermore, in the case where a node of interest exists on the right side of the parent node, for example, in the case where the RCH(n) described above is set as a node of interest, PAR(n), SIB(n), LCH(n), n and RCH(n) are arranged in that order, and a syntax tree with shapes representing substructures as nodes is generated, as shown in FIG. 7.

When the root is set at the end of a query pattern, a left-pointing triangle is generated which represents the whole structure from the root to the farthest descendant of the query pattern in the end. Otherwise, when the root is set at the beginning of a query pattern, a right-pointing triangle is generated which represents the whole structure from the root to the farthest right descendant. Whether the root is to be set at the beginning or at the end can be arbitrarily determined. In the description below, it is assumed that, for both of an analysis target sentence and a query pattern, the root is set at the end.

In matching score calculation, the score calculation unit 120 once associates the left-pointing triangle representing the whole structure of the syntax tree of the query pattern with the range from the beginning to the end of an analysis target sentence, and starts association sequentially from the nearest left child node LCH(root) of the root node. In an embodiment of the present invention, the left-pointing and right-pointing triangles correspond to the left sequence function 122 and the right sequence function 124 shown in FIG. 3, and the left-pointing and right-pointing trapezoids correspond to the left link function 126 and the right link function 128. In the score calculation process, the score calculation unit 120 recursively calls the group of the functions 122 to 128, attempts association between a substructure represented by each shape and a range in the analysis target sentence, gives a score by a marginal probability of dependency according to a dependency relation represented by the trapezoid, and determines an optimum matching string m and its marginal probability of pattern.

The details of processes by the sequence functions 122 and 124 and the link functions 126 and 128 will be described below. FIG. 8 is a diagram illustrating (A) the left sequence function and (B) the left link function in the first embodiment of the present invention. FIG. 9 shows (A, B) a pseudo-code of the left sequence function and a conceptual diagram illustrating a recursive call by the left sequence function, and (C, D) a pseudo-code of the left link function and a conceptual diagram illustrating a recursive call by the left link function in the first embodiment of the present invention. FIG. 10 shows (A, B) a pseudo-code of the right sequence function and a conceptual diagram illustrating a recursive call by the right sequence function, and (C, D) a pseudo-code of right link function and a conceptual diagram illustrating a recursive call by the right link function in the first embodiment of the present invention.

Figure 8A:
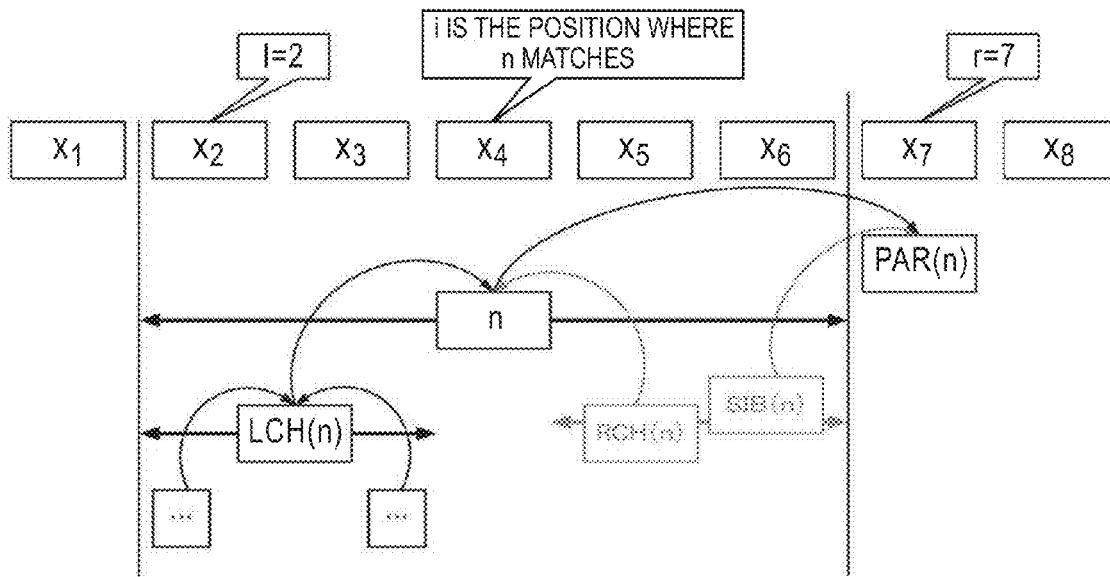
FIG. 8 is a diagram illustrating (A) a left sequence function and (B) a left link function in the first embodiment of the present invention.

As shown in FIG. 8(A) and FIG. 9(A, B), the left sequence function 122 is a function which receives a node n of a query pattern, a variable l representing a start position of a range in an analysis target sentence and a variable r representing an end position as arguments, and outputs the maximum value of the product of marginal probabilities of dependency in the range in the sentence when:

(1) the parent node PAR(n) corresponds to the r-th segment,
(2) the node of interest n and its descendants exist within the range of l, . . . , r−1, and
(3) the node of interest n exists on the left side of PAR(n).

That is, the left sequence function 122 is a function which associates, in relation to the node of interest n, a substructure between the farthest left descendant (the left-side end of descendants of LCH(n)) and the parent node PAR(n) with a range in the sentence specified by the variable l and the variable r.

In order to make a search through a structure inside the substructure, the left sequence function 122 attempts association of the node of interest n with any of l, ..., r−1 on the basis of condition (2) described above. When an attempt position is represented by a variable i, the pattern matching function $M(x_i, p_j)$ outputs "true (1)" (match(n, i)=true in the pseudo-code) if the node of interest n (=$p_j$) matches the i-th segment $x_i$. When the node of interest n matches $x_i$, the relation of dependency from the node of interest n to the parent node PAR(n) in the substructure of the query pattern is associated with the dependency from i-th segment to r-th segment in the sentence, and a marginal probability of dependency p(i, r) is given.

In the case where the node of interest n matches $x_i$, the nearest left child node LCH(n) of the node of interest n and its descendants are to exist within the range of l, ..., i−1 on the basis of the "projective" condition. Therefore, LCH(n), the variable l and the variable i are given as arguments, and the left sequence function 122 is recursively called. Similarly, since the nearest right child node RCH(n) of the node of interest n and its descendants, and a brothersibling node SIB (n) and its descendants are to exist within the range of i+1, ..., r−1 on the basis of the "projective" condition, the left link function 126, the details of which will be described later, is recursively called.

As the pseudo-code shown in FIG. 9(A), the left sequence function left_seq( ) recursively calls the left sequence function 122 and the left link function 126 which, for the left half and right half ranges of each attempt position i that at least the node of interest n matches, attempt association further inside the substructure of the query pattern. The left sequence function left_seq( ) calculates the product of each partial calculation result returned from the left sequence function 122 and the left link function 126 called recursively and the given marginal probability of dependency p(i, r). If there are multiple attempt positions i that the node of interest n matches, the maximum value is selected and returned to the call source as a partial calculation result.

Regarding the right sequence function 124, FIG. 10 (A, B) shows a pseudo-code and a conceptual diagram illustrating a recursive call. Similarly to the left sequence function, the right sequence function 124 is also a function which receives the node n of the query pattern, the variable l representing the start position of a range in an analysis target sentence and the variable r representing an end position as arguments, and outputs the maximum value of the product of marginal probabilities of dependency in the range in the sentence when:
(1) the parent node PAR(n) corresponds to the l-th segment,
(2) the node of interest n and its descendants exist within the range of l+1, ..., r, and
(3) the node of interest n exists on the right side of PAR(n).

That is, as shown in FIGS. 10(A) and (B), the right sequence function 124 is a function which associates, in relation to the node of interest n, a substructure between the parent node PAR(n) and the farthest right descendant (the right-side end of descendants of RCH(n)) with a range in the sentence specified by the variable l and the variable r. In order to make a search through a structure further inside the substructure, the right sequence function 124 attempts association of the node of interest n with any of l+1, ..., r on the basis of condition (2) described above. When the node of interest n matches the segment $x_1$, the relation of dependency from the node of interest n to the parent node PAR(n) in the substructure of the query pattern is associated with the position between the segments of a pair of the i-th→l-th segments in the sentence, and a marginal probability of dependency p(i, l) is given. On the basis of the "projective" condition, the sibling of the node of interest n and its descendants, and the nearest left child of n and its descendants exist on the left half of the attempt position i that the node of interest n matches, and the nearest right child of the node of interest n and its descendants exist on the right half. Therefore, the right sequence function 124 recursively calls the right sequence function 124 and the right link function 128 which further attempt association for the inside, and outputs the maximum value of the product of each of returned partial calculation results and the given marginal probability of dependency p(i, l).

Figure 8B:
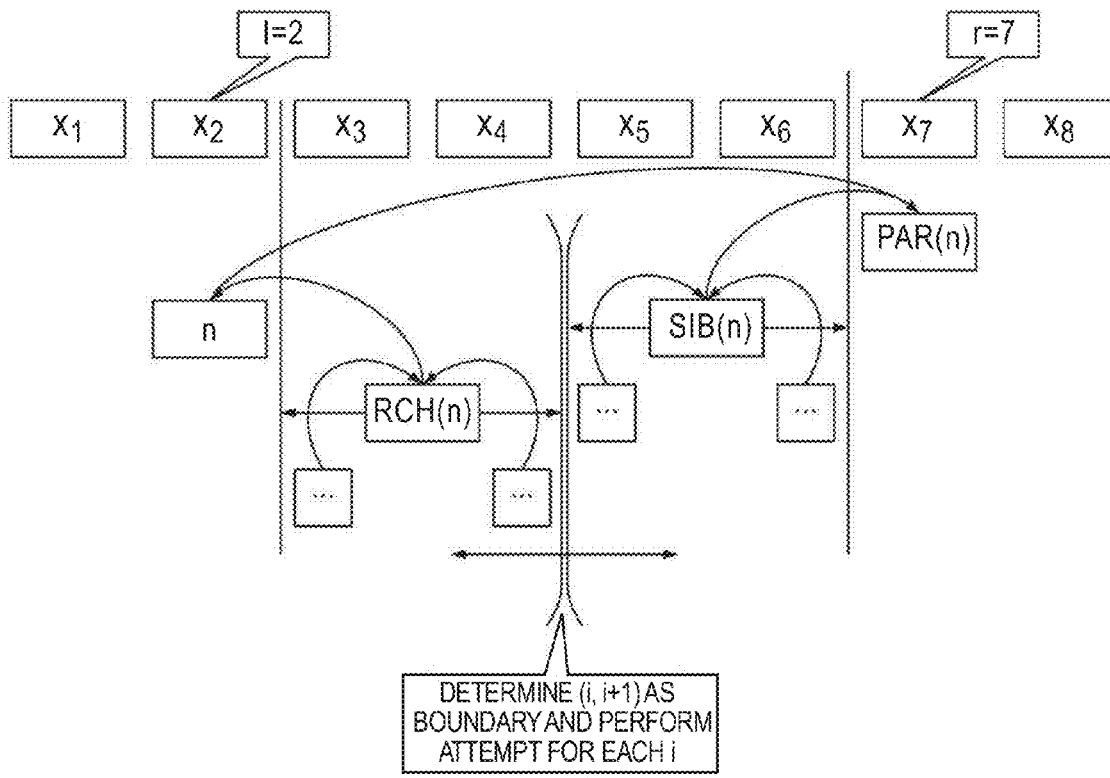

As shown in FIG. 8(B) and FIG. 9(C, D), the left link function 126 is a function which receives the node n of the query pattern, the variable l representing the start position of a range in an analysis target sentence and the variable r representing an end position as arguments, and outputs the maximum value of the product of marginal probabilities of dependency in the range in the sentence when:
(1) the parent node PAR(n) corresponds to the r-th segment,
(2) the node of interest n corresponds to the l-th segment,
(3) the nearest right child node RCH(n) of the node of interest n and its descendants, and the sibling node SIB (n) and its descendants exist within the range of l+1, ..., r−1, and
(4) the node of interest n exists on the left side of PAR(n).

That is, the left link function 126 is a function which associates, in relation to the node of interest n, a substructure between the node of interest n and the parent node PAR(n) with a range in the sentence specified by the variable l and the variable r.

On the basis of the "projective" condition, the right-side end descendant of the nearest right child node RCH(n) exists on the left of left-side descendant of the sibling node SIB(n). Therefore, in order to make a search through a structure inside the substructure, the left link function 126 attempts to set a boundary between the right-side end descendant of the nearest right child node RCH(n) of the node of interest n and the left-side end descendant of the sibling node SIB(n) at the position (i, i+1). There may be a case where another segment exists between both end descendants.

Because the nearest right child node RCH(n) and its descendants are to exist within the range of l+1, ..., i−1, the left link function 126 gives RCH(n), the variable l and the variable i as arguments and recursively calls the right sequence function 124, for each attempt position i. Similarly, because the sibling node SIB(n) and its descendants are to exist within the range of i+1, ..., r−1, on the basis of the "projective" condition, the left link function 126 gives SIB (n), a variable i+1 and the variable r as arguments and recursively calls the left sequence function 122, for each attempt position i. Like the pseudo-code shown in FIG. 9(C), the left link function left_link( ) calculates the product of partial calculation results returned from the right sequence function 124 and the left sequence function 122 called recursively, selects the maximum value at each attempt position i, and returns the value to the call source as a partial calculation result.

Regarding the right link function 128, FIG. 10 (C, D) shows a pseudo-code and a conceptual diagram illustrating a recursive call. Similarly to the left link function, the right link function 128 is a function which receives the node n of the query pattern, the variable l representing a start position of a range in an analysis target sentence and the variable r representing an end position as arguments, and outputs the maximum value of the product of marginal probabilities of dependency in the range in the sentence when:

(1) the parent node PAR(n) corresponds to the l-th segment,
(2) the node of interest n corresponds to the r-th segment,
(3) the nearest left child node LCH(n) of the node of interest n and its descendants, and the sibling node SIB (n) and its descendants exist in the range of l+1, . . . , r−1, and
(4) the node of interest n exists on the right side of PAR(n).

That is, as shown in FIGS. 10(C) and (D), the right link function 128 is a function which associates, in relation to the node of interest n, a substructure between the parent node PAR(n) of the node of interest n and the node of interest n with a range in the sentence specified by the variable l and the variable r. In order to make a search through a structure further inside the substructure, the right link function 128 attempts to set a boundary between the right-side end descendant of the sibling node SIB(n) of the node of interest n and the left-side end descendant of the nearest left child node LCH(n) at the position (i, i+1). Then, for each attempt position i, the right link function 128 gives the sibling node SIB(n), the variable l and the variable i as arguments and recursively calls the right sequence function 124; and gives the nearest left child node LCH(n), the variable i+1 and the variable r and recursively calls the left sequence function 122. Like the pseudo-code shown in FIG. 10(C), the right link function right_link( ) calculates the product of partial calculation results returned from the right sequence function 124 and the left sequence function 122 called recursively, selects the maximum value at each attempt position i, and returns the value to the call source as a partial calculation result.

Figure 11:
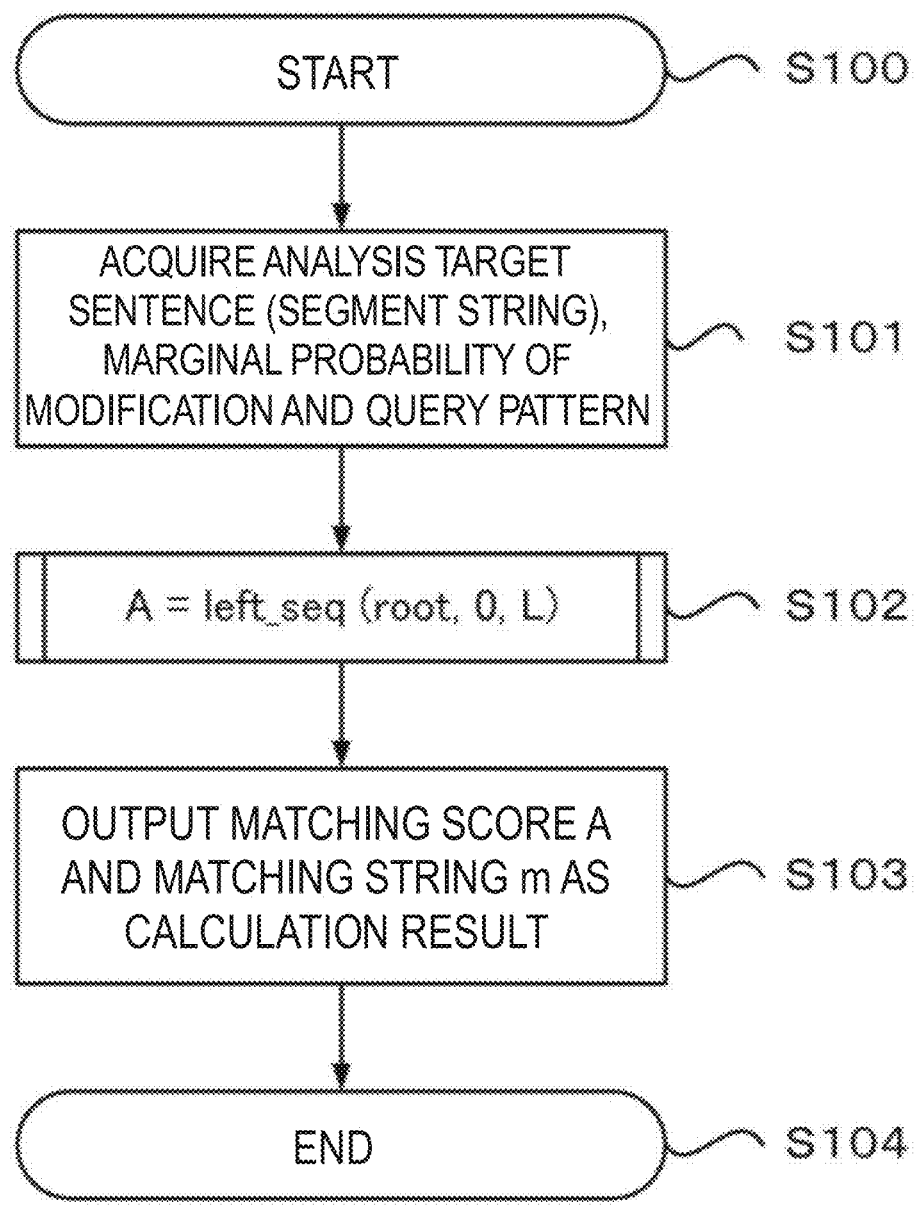
FIG. 11 is a flowchart showing a main routine of a matching score calculation process executed by the computer apparatus according to the first embodiment of the present invention.

The details of the matching score calculation process using the group of functions described above, according to the first embodiment of the present invention will be described below. FIG. 11 is a flowchart showing a main routine of the matching score calculation process executed by the computer apparatus according to the first embodiment of the present invention. The process shown in FIG. 11 starts at step S100 in response to an instruction of matching score calculation in which the analysis target sentence 150, the query pattern 160 and the marginal probability of dependency 170 are specified being given.

At step S101, the input unit 110 acquires the specified analysis target sentence 150, query pattern 160 and marginal probability of dependency 170 as input data. The analysis target sentence can be acquired from a database or a file. If statistical syntax analysis has been performed for the analysis target sentence in advance, the marginal probability of dependency can be acquired as the analysis data of the analysis. If the statistical syntax analysis has not been performed in advance, statistical syntax analysis of the analysis target sentence is executed, and the analysis data thereof can be acquired as the marginal probability of dependency. The query pattern can be acquired from a database or a file, or it can be acquired by interpreting a query sentence specified by a user.

Figure 12:
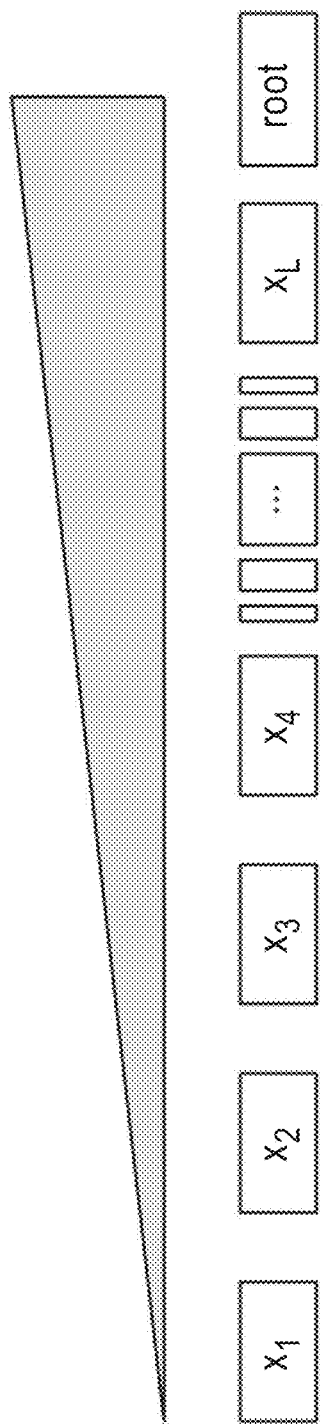
FIG. 12 is a diagram showing association between an initial query pattern and an analysis target sentence, by the main routine according to the first embodiment of the present invention.

At step S102, the score calculation unit 120 gives the root of the query pattern, 0 and a sentence length L and calls a left sequence function left_seq(root, 0, L). FIG. 12 is a diagram showing association between an initial query pattern and an analysis target sentence, by the main routine of the matching score calculation process. As shown in FIG. 12, the whole structure from the farthest left descendant to the root, represented by a left-pointing triangle of the query pattern is associated with the whole range from the beginning to the end of the analysis target.

Referring to FIG. 11 again, when all the recursive calculations after the left sequence function left_seq(root, 0, L) have been completed and returned calculation results are acquired, the output unit 140 outputs an obtained matching score A and matching string m as a calculation result at step S103, and this matching calculation process ends at step S104.

Figure 13:
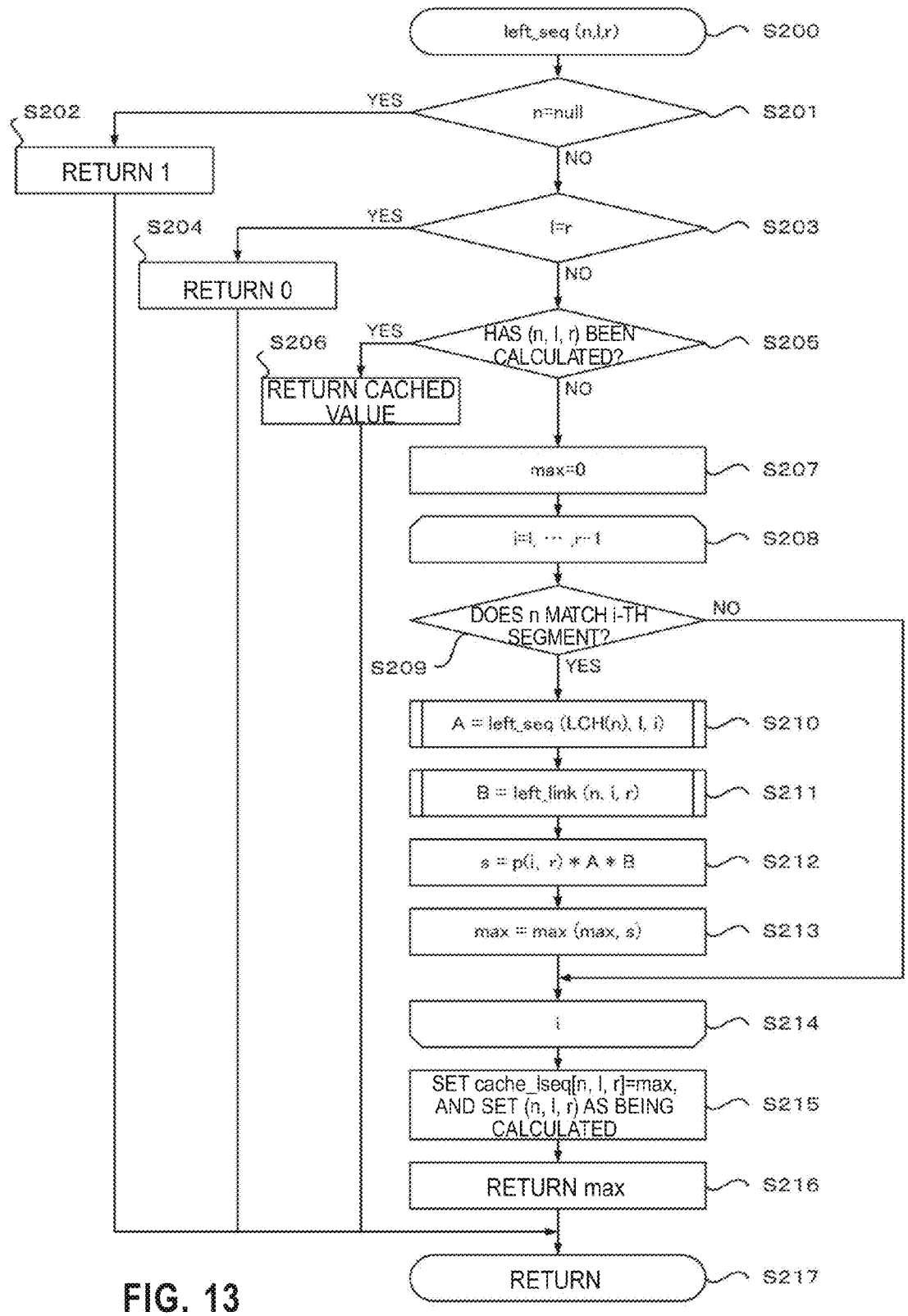
FIG. 13 is a flowchart showing the routine of the left sequence function called in the matching score calculation process executed by the computer apparatus according to the first embodiment of the present invention.

FIG. 13 is a flowchart showing the routine of the left sequence function left_seq(n, l, r) called in the matching score calculation process is executed by the computer apparatus according to the first embodiment of the present invention. The process shown in FIG. 13 is called, for example, by the processing of step S102 shown in FIG. 11, and it starts at step S200. At step S201, the score calculation unit 120 determines whether the node n given as an argument is an empty value (null) or not. If it is determined that the node n is null at step S201 (YES), the process is branched to step S202, and the value "1" is returned as a return value. At step S217, this process is ended and returned to the call source. This means that the end of a branch of the tree structure of the query pattern is reached. On the other hand, if it is determined that the node n is not null at step S201 (NO), the process is branched to S203.

At step S203, the score calculation unit 120 determines whether the variables l and r given as arguments are the same value or not. If it is determined that the variables l and r are the same value at step S203 (YES), the process is branched to step S204. At step S204, the score calculation unit 120 returns the value "0" as a return value and, at S217, ends this process and returns it to the call source. On the other hand, if it is determined that the variables l and r are different values at step S203 (NO), the process is branched to step S205.

At step S205, the score calculation unit 120 refers to the dynamic programming table 130 to determine whether the calculation result of the left sequence function has already been cached with the arguments (n, l, r). If it is determined at step S205 that the calculation result has been cached with the arguments (n, l, r) and are available (YES), the process is branched to step S206. At step S206, the score calculation unit 120 reads the cached value corresponding to the arguments (n, l, r) from the dynamic programming table 130 instead of performing calculation again, ends this process at step S217, and returns the cached value to the call source. In the embodiment of the present invention, since calculation is not repeated twice or more for the same set of arguments, the calculation can be performed in polynomial time according to the size of a query pattern and the length of an analysis target sentence.

On the other hand, if it is determined at step S205 that the calculation result has not been cached yet (NO), the process is branched to step S207. At step S207, the score calculation unit 120 initializes a variable max holding the maximum value of a partial score to be returned as a calculation result return value, and executes the loop from step S208 to step S214. In the loop from step S208 to step S214, the score calculation unit 120 performs the process of steps S209 to S213 for each of attempt positions i from the start position l to an end position r−1 of a range for which association is currently being performed. At step S209, the score calculation unit 120 determines whether or not the node n given as an argument matches the segment $x_i$ of the attempt position i. If it is determined at step S209 that the node n does not match the segment $x_i$ (NO), the process is branched to step S207 and advanced for the next i.

On the other hand, if it is determined at step S209 that the node n matches the segment $x_i$ at the attempt position i (YES), the process is branched to S210. In this case, since the nearest left child node LCH(n) and its descendants can exist within the range from the start position l of the range for which association is currently being performed to an attempt position i−1, the score calculation unit 120 gives the nearest left child node LCH(n) of the node n, the variable l and the variable i and recursively calls the left sequence function left_seq( ) at step S210. When a calculation result is returned from the left sequence function left_seq( ) the return value is substituted for a variable A. If the node n matches the segment $x_i$, the nearest right child node RCH(n), the sibling node SIB(n) and their descendants can exist in the range from an attempt position i+1 to an end position l of the range for which association is currently being performed. Therefore, at step S211, the score calculation unit 120 gives the node n, the variable i and the variable r and recursively calls the left link function left_link( ) When a calculation result is returned from the left link function left_link( ) the return value is substituted for a variable B.

At step S212, the score calculation unit 120 calculates a product s of the marginal probability of dependency p(i, r) corresponding to the matched attempt position i and the variable r, the return value A from the left sequence function left_seq(LCH(n), l, i) at step S210, a return value B from the left link function left_link(n, i, r) at step S211. At step S213, the score calculation unit 120 compares the value of max currently held and the product s calculated at step S213, and updates max with a larger value between them.

Through steps S208 to S214, the product s of the marginal probability of dependency p(i, r), the calculation result A of the left sequence function for the nearest left child node and the calculation result B of the left link function is calculated, for each of those that match n among attempt positions i from the variable l to a variable r−1, and a locally maximum value among them is held in max. When exiting the loop from steps S208 to S214, the score calculation unit 120 stores the value of max into an array of cache_lseq[n, l, r] in the dynamic programming table 130 and sets (n, l, r) as being calculated, at step S215. At step S216, the score calculation unit 120 returns max as a return value and, at step S217, ends this process and returns it to the call source.

Figure 14:
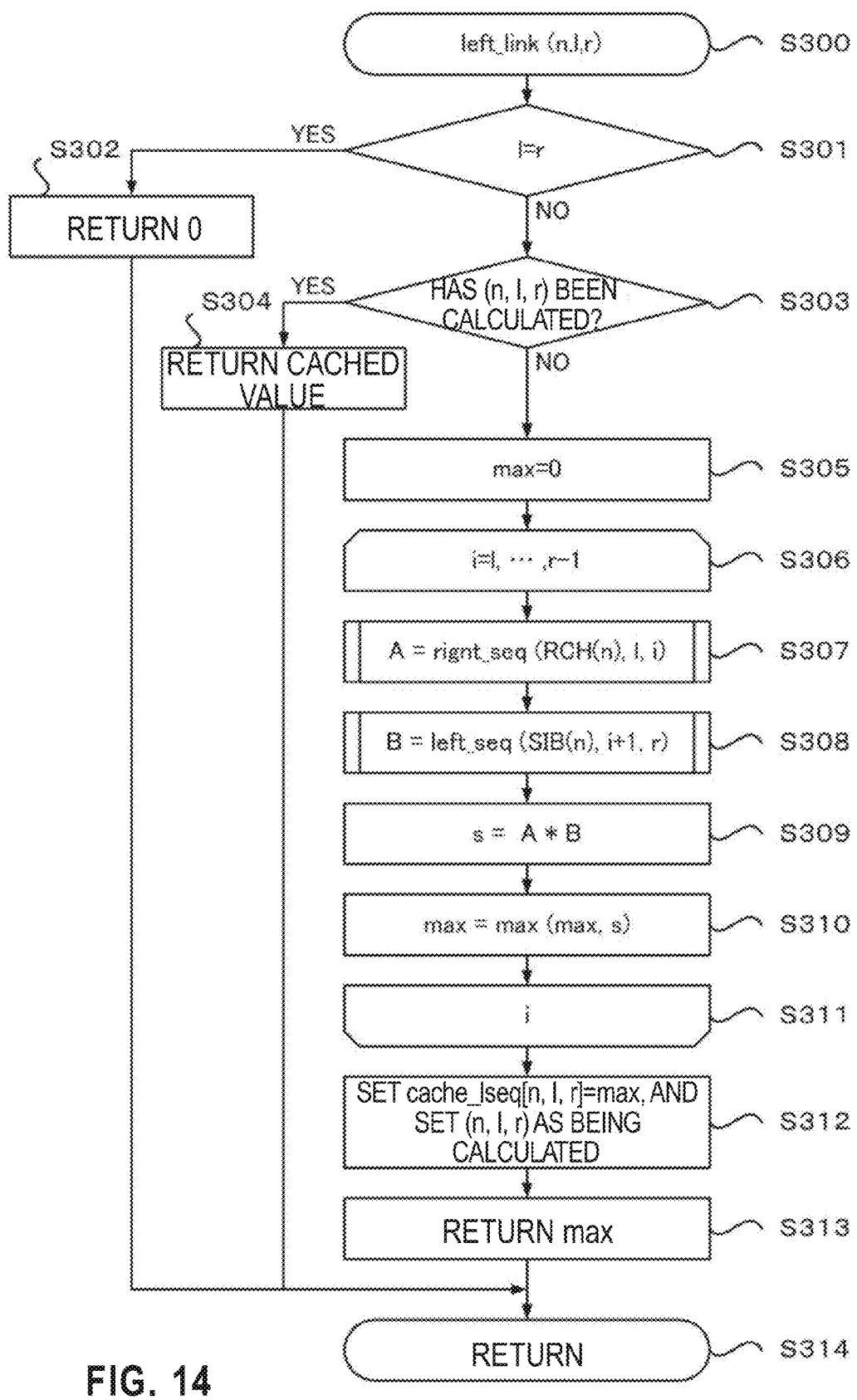
FIG. 14 is a flowchart showing the routine of the left link function called in the matching score calculation process executed by the computer apparatus according to the first embodiment of the present invention.

FIG. 14 is a flowchart showing the routine of the left link function left_link(n, l, r) called in the matching score calculation process executed by the computer apparatus according to the first embodiment of the present invention. The process shown in FIG. 14 is called, for example, by the processing of step S211 shown in FIG. 13, and it starts at step S300. At step S301, the score calculation unit 120 determines whether the variable l and the variable r given as arguments are the same value or not. If it is determined that the variables l and r are the same value at step S391 (YES), the process is branched to step S302. At step S302, the score calculation unit 120 returns the value "0" as a return value and, at S314, ends this process and returns it to the call source. On the other hand, if it is determined that the variables l and r are different values at step S301 (NO), the process is branched to step S303. At step S303, the score calculation unit 120 refers to the dynamic programming table 130 to determine whether the calculation result of the left link function has already been cached with the arguments (n, l, r). If it is determined at step S303 that the corresponding calculation result has been cached and is available, the process is branched to step S304. At step S304, the score calculation unit 120 reads the cached value corresponding to the arguments (n, l, r) from the dynamic programming table 130, ends this process at step S314, and returns the cached values to a calling source.

On the other hand, if it is determined at step S303 that the calculation has not been performed yet (NO), the process is branched to step S305. At step S305, the score calculation unit 120 initializes the variable max holding the maximum value to be returned as a calculation result return value, and advances the process to the loop from step S306 to S311. Through steps S306 to S311, the score calculation unit 120 executes the process of steps S307 to S310 for each of attempt positions i from the start position l to the end position r−1 of a range for which association is currently being performed.

The attempt position i indicates the boundary between the right-side end of descendants of the nearest right child node RCH(n) and the left-side end of descendants of the sibling node SIB(n). The nearest right child node RCH(n) and its descendants can exist within the range from the start position l to the attempt position i−1 of the range for which association is currently being performed. Therefore, at step S307, the score calculation unit 120 gives the nearest right child node RCH(n) of the node n, the variable l and the variable i given as arguments and recursively calls the right sequence function right_seq( ) When a calculation result is returned from the right sequence function right_seq( ) the return value is substituted for the variable A.

Since the sibling node SIB(n) and its descendants exist within the range from the attempt position i+1 to the end position r−1 of the range for which association is currently being performed, the score calculation unit 120 gives the sibling node SIB(n) of the node n, the variable i+1 and the variable r given as arguments and recursively calls the left sequence function left_seq( ) at step S308. When a calculation is returned from left sequence function left_seq( ) the return value is substituted for the variable B. At step S309, the product s of the return value A from the right sequence function right_seq( ) of step S307 and the return value B from the left sequence function left_seq( ) of step S308 is calculated. At step S310, the value of max currently held and the product s calculated at step S309 are compared, and max is updated with a larger value between them.

Through steps S306 to S311, the product s of the calculation result A of the right sequence function right_seq( ) for the nearest right child node and the calculation result B of the left sequence function left_seq( ) for the sibling node is determined for each attempt position i from the variable l to the variable r−1, and the locally maximum value among them is held in max. When exiting the loop from steps S306 to S311, the score calculation unit 120 stores the value of max into an array of cache_llink[n, l, r] in the dynamic programming table 130 and sets (n, l, r) as being calculated, at step S312. At step S313, the score calculation unit 120 returns max as a return value and, at step 314, ends this process and returns it to the call source.

Figure 15:
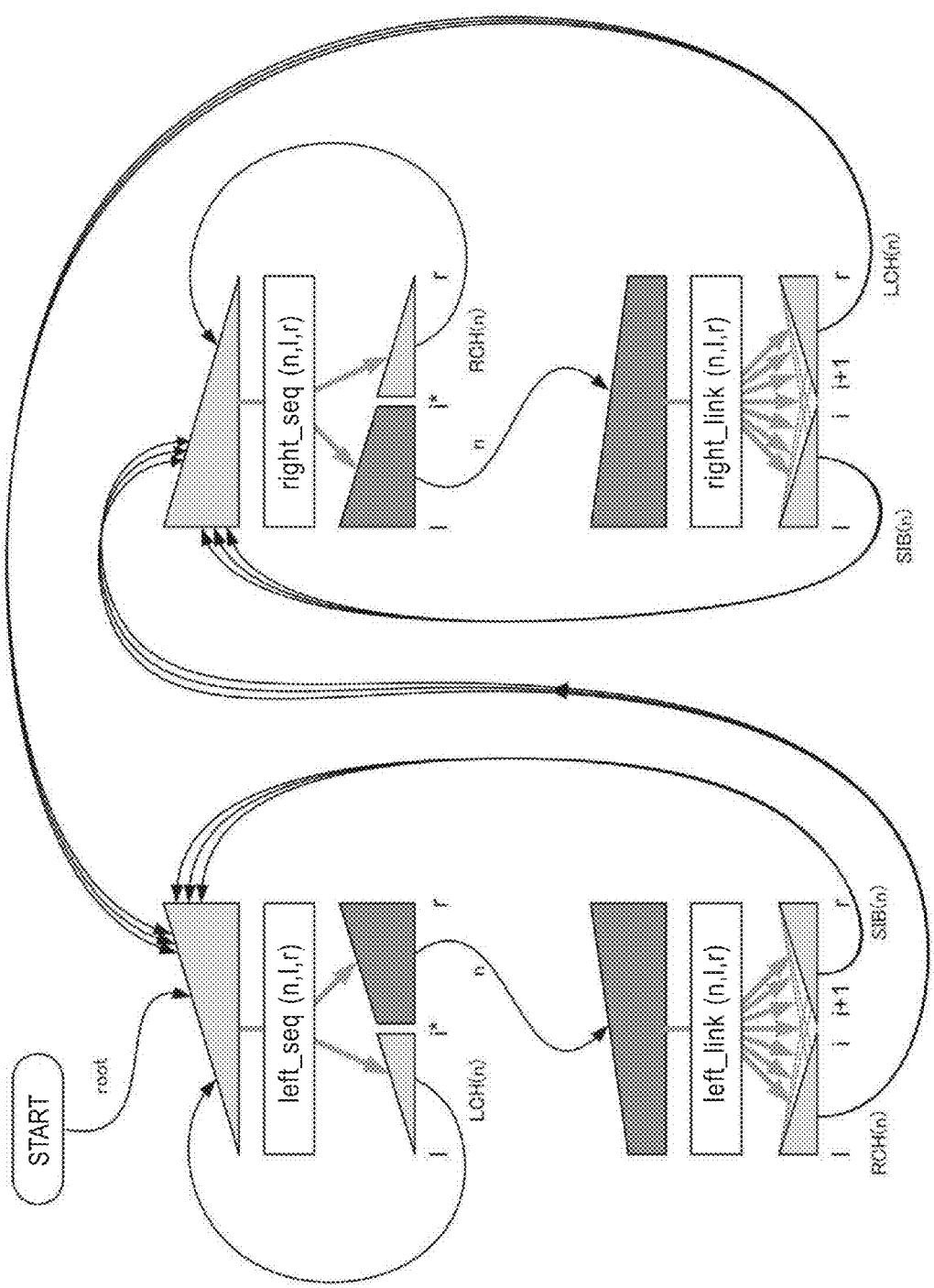
FIG. 15 is a diagram illustrating mutual recursive calls among the left sequence function, the left link function, the right sequence function and the right link function according to the first embodiment of the present invention.

FIG. 15 is a diagram illustrating mutual recursive calls among the left sequence function, the left link function, the right sequence function and the right link function. The matching score calculation process starts by the left sequence function left_seq( ) being called from the main routine, with the root node (representing the whole structure) of an Eisner syntax tree of a query pattern and the whole range of an analysis target sentence as arguments. If the root is set at the beginning, the right sequence function right_seq( ) is called. The left sequence function left_seq(n, l, r) divides the range of (l, . . . , r) for which association is currently being performed, at each attempt position i* that matches a node n, recursively calls a forward-direction left sequence function left_seq (LCH(n), l, i) with the nearest left child node LCH(n) as an argument, for the left-half range (l, . . . , i) on the side opposite to the parent, and recursively calls a forward-direction left link function left_link(n, i, r) with the node n as an argument, for the right-half range (i, . . . , r) on the parent side.

The left link function left_link(n, l, r) divides the range (l, . . . , r) for which association is currently being performed, at each attempt position i, recursively calls an opposite-direction right sequence function right_seq(RCH(n), l, i) with the nearest right child node RCH(n) as an argument, for the left-half range (l, ..., i) on the side opposite to the parent, and recursively calls a forward-direction left sequence function left_seq(SIB(n), i+1, r) with the sibling node SIB(n) as an argument, for the right-half range (i+1, ..., r) on the parent side.

The right sequence function right_seq(n, l, r) divides the range for which association is currently being performed, at each attempt position i* that matches the node n, recursively calls a forward-direction right link function right_link(n, l, i) with n as an argument, for the left-half range (l, ..., i) on the parent side, and recursively calls a forward-direction right sequence function right_seq(RCH(n), i, r) with the nearest right child node RCH(n) as an argument, for the right-half range (i, ..., r) on the side opposite to the parent. The right link function right_link(n, l, r) divides the current range, at each attempt position i, recursively calls a forward-direction right sequence function right_seq(SIB(n), l, i) with the sibling node SIB(n) as an argument, for the left-half range (l, ..., i) on the parent side, and recursively calls an opposite-direction left sequence function left_seq(LCH(n), i+1, r) with the nearest left child node LCH(n) as an argument, for the right-half range (i+1, ..., r) on the side opposite to the parent.

Figure 16:
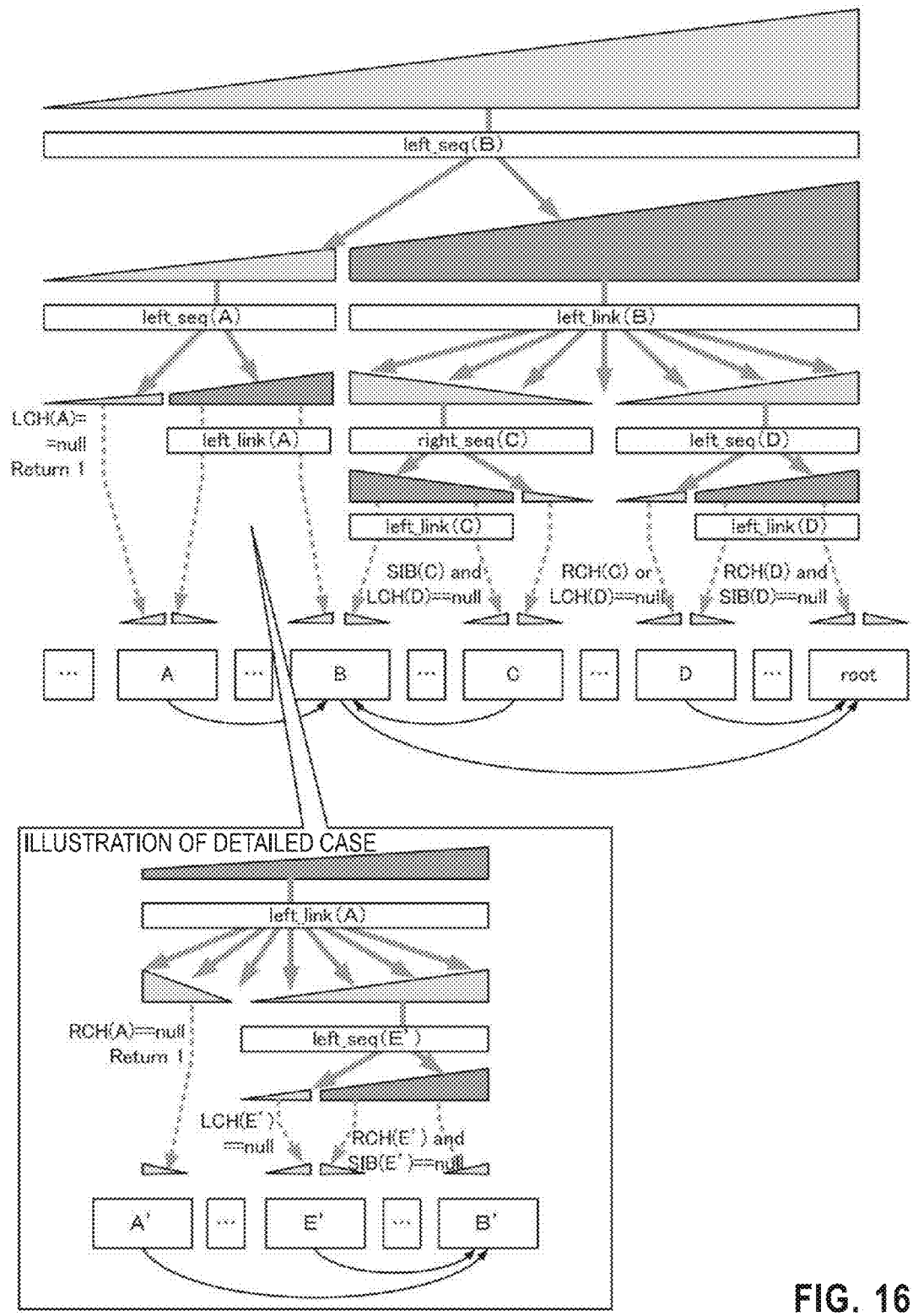
FIG. 16 is a diagram showing that association is performed for the whole structure of a query pattern down to the end, by the mutual recursive calls among the functions in the first embodiment of the present invention.

FIG. 16 is a diagram showing that association is performed for the whole structure of a query pattern down to the end, by mutual recursive calls among the left sequence function, the left link function, the right sequence function and the right link function. First, the whole structure of the query pattern represented by a left-pointing triangle at the top is associated with the whole range from the beginning to the end of an analysis target sentence, and a left sequence function left_seq (B) with the nearest left child node LCH (root) of the root as an argument is called. At an attempt position that matches a node B, the left sequence function left_seq(B) divides a range for which association is being performed, and recursively calls a left sequence function left_seq(A) with the nearest left child node LCH(B) as an argument, for the left half range. At the same time, the left sequence function left_seq(B) recursively calls a left link function left_link(B) with the node B as an argument, for the right half range. Here, the marginal probability of dependency from the node B to the root is given as a score.

At an attempt position that matches a node A, the left sequence function left_seq(A) calls a left sequence function left_seq(null) with the nearest left child node LCH(A) as an argument, for the left half range. At the same time, the left sequence function left_seq(A) calls a left link function left_link(A) with the node A as an argument, for the right half range. Here, the marginal probability of dependency from the node A to the node B is given as a score. As for the left sequence function left_seq(null), 1 is returned which indicates that the end of the query pattern is reached.

On the other hand, the left link function left_link(B) attempts to set a position separating descendants of the nearest right child node RCH(B) and the sibling node SIB(B) within the range for which association is being performed and, for each attempt position, calls a right sequence function right_seq(C) with the nearest right child node RCH(B) as an argument for the left-half range, and a left sequence function left_seq(D) with the sibling node SIB(B) as an argument for the right-half range.

Description of the right sequence function right_seq(C) will be continued. If there is an attempt position that matches a node C, the right sequence function right_seq(C) calls a right link function right_link(C) with the node C as an argument, for the left-half range at that position. Here, if there is an attempt position that matches the node C, the marginal probability of dependency from the node C to the node B is given as a score. If there is not an attempt position that matches the node C, 0 is returned. At the same time, the right sequence function right_seq(C) calls a right sequence function right_seq(null) with the nearest right child node RCH(C) as an argument, for the right half range. As for the right sequence function right_seq(null), 1 is returned because the end of the query pattern is reached. The right link function right_link(C) attempts to set a position separating descendants of the sibling node SIB(C) and the nearest left child node LCH(C) within the range for which association is being performed, and, for each attempt position, calls the right sequence function right_seq(null) with the sibling node SIB(C) as an argument for the left-half range, and the left sequence function left_seq(null) with the nearest left child node LCH(C) as an argument for the right-half range. As for the right sequence function right_seq(null) and the left sequence function left_seq(null), 1 is returned because the end of the query pattern is reached. The process described above is similar for the left sequence function left_seq(D).

Furthermore, as shown in the balloon in FIG. 16, if a node E', which is the sibling node of a node A', exists between the node A' and a node B' of a query pattern, the left link function left_link(A) attempts to set a position separating descendants of the nearest right child node RCH(A) and the sibling node SIB(A) within the range for which association is being performed, and calls the right sequence function right_seq(null) with the nearest right child node RCH(A) as an argument for the left-half range, and a left sequence function left_seq(E) with the sibling node SIB(A) as an argument for the right-half range, for each attempt position. The same goes for the sequence function left_seq(E). When an attempt position that matches the node E is found, the marginal probability of dependency from the node E' to the node B is given and returned as a score.

By repeating the recursive calls as described above, at the time when each end of a query pattern is associated, recursive calls for that system is finished, and a maximum value of products of marginal probabilities of dependency in partial calculations is returned. In the end, a maximized product of marginal probabilities of dependency that approximates the marginal probability of pattern of optimum matching m is returned to the left sequence function left_seq(root).

By mutually performing the recursive calls as shown in FIGS. 15 and 16, association for the whole structure of a query pattern down to end nodes is performed, each matching position that gives the locally maximum marginal probability is searched for, an optimum matching string m that gives an approximate value of a marginal probability of pattern to be globally the maximum is determined, and, at the same time, a marginal probability of pattern to be globally the maximum is approximately calculated.

Figure 17:
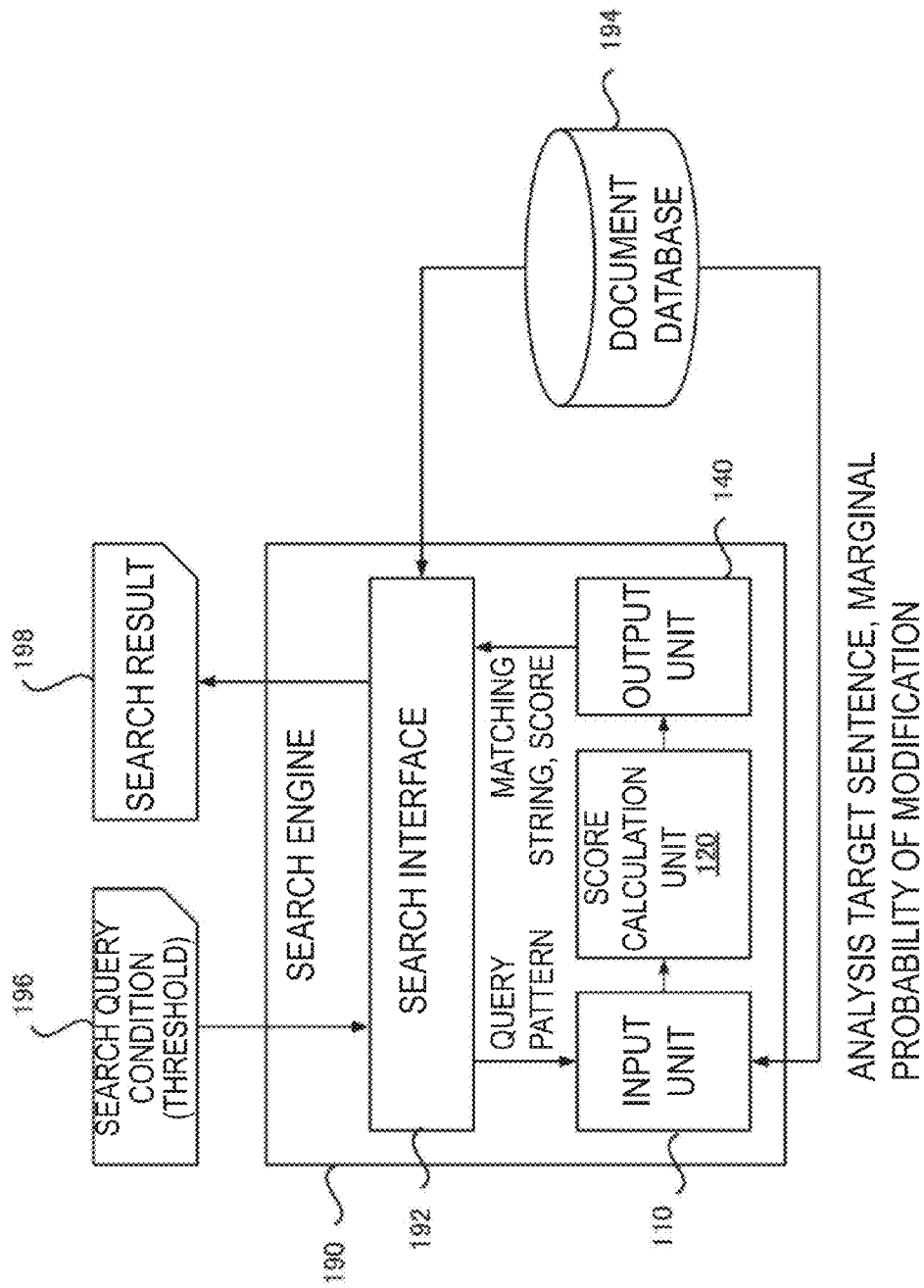
FIG. 17 is a functional block diagram of an information search system incorporated with a matching score calculation function according to a first embodiment of the present invention.

The process for calculating a score of matching with an analysis target sentence has been described. Now, an information search system in which the matching score calculation process is incorporated and which performs information search in consideration of a dependency structure will be described below. FIG. 17 is a functional block diagram of an information search system incorporated with the matching score calculation function according to the first embodiment. A search engine 190 constituting the information search system shown in FIG. 17 is similarly realized on a computer apparatus. The search engine 190 includes a search interface 192 to be an input/output interface with a user, and the input unit 110, the score calculation unit 120 and the output unit 140 which have been described above. Furthermore, the information search system includes a document database 194 which stores search target documents, and the search engine 190 can access the document database 194. Each document includes one or more sentences. Regarding the relation between each document and each sentence, for example, the position of a sentence in a document, it is assumed that both are associated with each other in advance. Similarly, it is assumed that character string analysis such as morpheme analysis has been performed for each sentence in advance. Each sentence is configured as a segment or word string and given data of marginal probability of dependency.

The search interface 192 acquires a user input 196 which includes a search query specifying a query pattern, and conditions as needed, from a user. The conditions include a threshold for a matching score to be included in a search result, and a condition for specifying a search range of a document. The conditions may be given from the user or may be given as a default value of the system. As the search query, a pattern string p specifying a query pattern and par(p, i) defining a parent-child relation in the query pattern may be directly given. The pattern strings p and par(p, i) of the query pattern may be given by interpreting a character string written in accordance with a predetermined format. Furthermore, if there is a file in which the query pattern is written in advance, the filename may be given.

When receiving the user input 196, the search interface 192 hands the query pattern and a sentence identification value specifying each sentence in a set of sentences within a search range over to the input unit 110 to request calculation of a matching score of each sentence. The input unit 110 acquires data of the sentences and their marginal probabilities of dependency from the document database 194 in accordance with information specifying the analysis target sentences, and hands the analysis target sentences, the query pattern and the marginal probabilities of dependency over to the score calculation unit 120 as input data. Otherwise, in another embodiment, the search interface 192 can acquire data of analysis target sentences and their marginal probabilities of dependency from the document database 194 and directly hand the data over to the input unit 110 to request calculation of the matching score of each sentence.

The score calculation unit 120 calculates matching scores for the given sentences, and the output unit 140 returns a matching string m and a score for each of the given sentences to the search interface 192. When acquiring the matching score and the matching string for each of the requested sentences, the search interface 192 acquires, with a threshold specified by the user or a default threshold as a reference, a set of sentences to which a score above the threshold is given and presents a search result 198 to the user. Here, by adjusting the level of the threshold, it is possible to adjust the precision and the recall in the information search. Thereby, it is possible to increase the precision to acquire accurate reputation information and increase the recall to comprehensively acquire all sentences showing problems.

If the relation between a document and a sentence is associated in advance, matched positions can be highlighted on a summary of a matched document or on a summary around a matched position in a document. Furthermore, in another embodiment, it is possible to determine a sum total of scores of sentences in a set of sentences such as a document. Thereby, it is possible to know approximately how many sentences, for example, showing a problem exists.

According to the first embodiment described above, it is possible to efficiently perform approximate calculation of a marginal probability of pattern which indexes the degree of matching of a sentence with a query pattern having a dependency structure and which can be treated as a probability. As described above, the marginal probability of pattern is a marginal probability of an analysis candidate syntax tree which includes a pattern as a subtree being generated among all analysis candidates, and it agrees with a sum total of analysis probabilities of syntax tree analysis candidates including the pattern as the subtree among all the analysis candidates. Therefore, it is conventionally necessary to enumerate all analysis candidates, extract syntax tree candidates that match a query pattern by pattern matching and determine a sum total of the analysis probabilities of the candidates. In this case, the number of analysis candidates increases exponentially according to the sentence length, and it is quantitatively difficult and not realistic to do so.

In comparison, in the computer apparatus 100 according to the first embodiment of the present invention, it is possible to efficiently perform approximate calculation without enumerating all analysis candidates, by approximating the marginal probability of pattern by the product of marginal probabilities of dependency given between segments of segment pairs in an analysis target sentence. In the score calculation process to which the dynamic programming is applied, according to the first embodiment of the present invention, a group of functions is recursively called which attempt association between a substructure of a query pattern and a range in an analysis target sentence, the partial calculation result is recursively calculated for the inside of the substructure of the query pattern and the range in the sentence, and thereby, a global marginal probability of pattern for the query pattern is determined. As for the amount of calculation, since the dynamic programming can be applied, and the calculation cost can be exchanged with the storage cost, it is only approximately $O(L^3M)$, in which L and M denote the sentence length and the pattern size, respectively.

Second Embodiment

Figure 18:
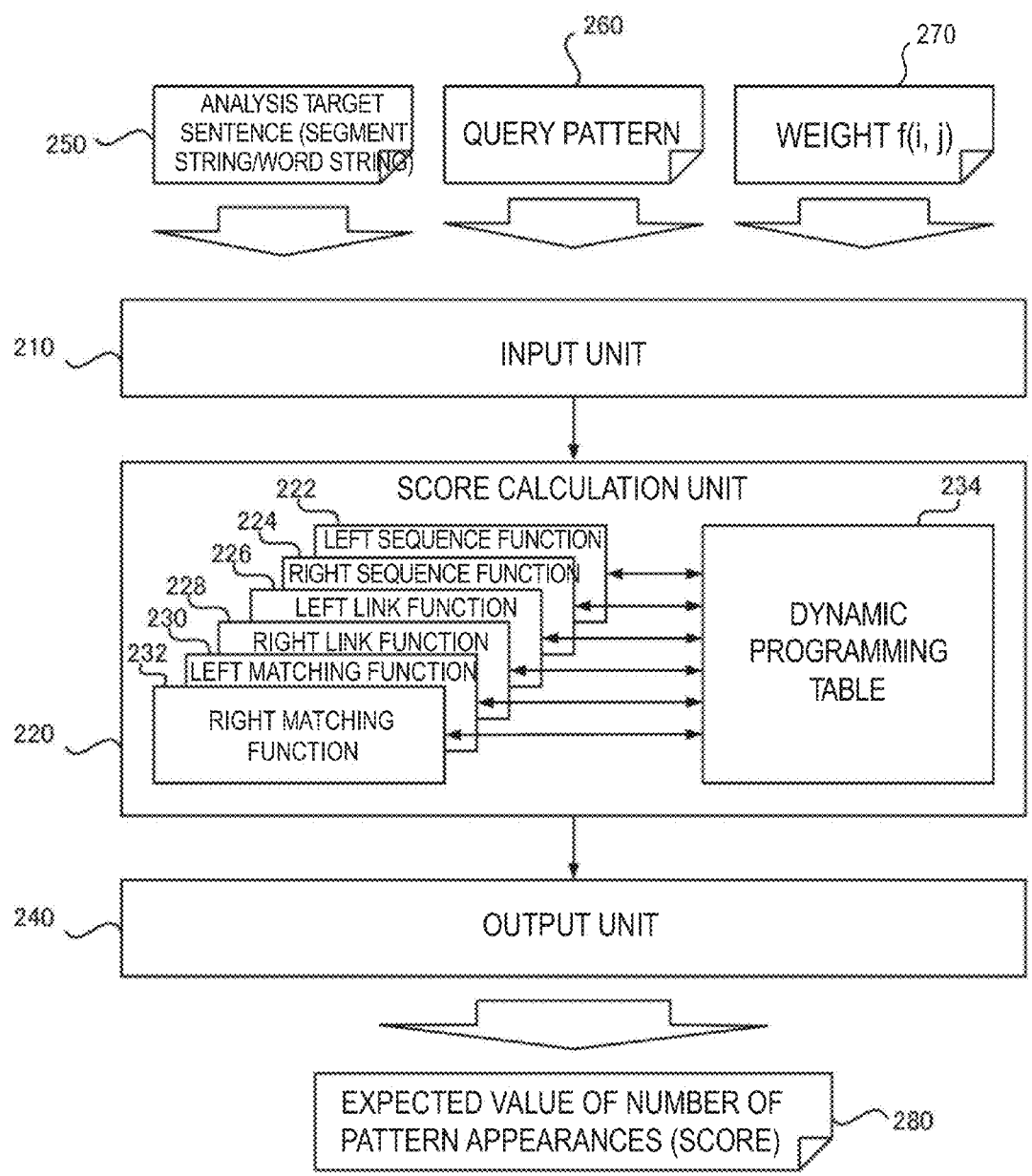
FIG. 18 is a functional block diagram of a computer apparatus according to a second embodiment of the present invention.

A computer apparatus which calculates a matching score according to a second embodiment of the present invention will be described below. The computer apparatus according to the second embodiment calculates an expected value of the number of pattern appearances as a matching score, instead of the marginal probability of pattern calculated in the first embodiment. FIG. 18 shows functional blocks of a computer apparatus 200 according to the second embodiment of the present invention. Though the computer apparatus 200 shown in FIG. 18 has a configuration similar to the first embodiment, it is different from the first embodiment by the input data to be inputted to an input unit 210, a group of functions provided for a score calculation unit 220, and a calculation result outputted by an output unit 240.

The input data in the second embodiment of the present invention is similar to that in the first embodiment in that it includes an analysis target sentence 250 and a query pattern 260. It is different, however, from the first embodiment in that a weight f(i, j) is acquired instead of the marginal probability of dependency p(i, j) in the first embodiment. The weight f(i, j) indexes dependency tendency from the i-th segment to the j-th segment similarly to the marginal probability of dependency in the first embodiment. The weight f(i, j) is defined by a conditional log-linear model for dependency parsing, and it can be calculated by an exponential function of the inner product of a characteristic vector (p(i, j) between a segment i and a segment j and a weight vector w estimated from learned data. The weight f(i, j) is data generated in the process of statistical syntax analysis.

The score calculation unit 220 calculates the score of matching of the analysis target sentence 250 with the query pattern 260 using input data acquired by the input unit 210. In the second embodiment, an expected value of the number of appearances of a pattern in all analysis candidates that can exist for the analysis target sentence 250, that is, the expected value of the number of pattern appearances is calculated as a matching score. The expected value of the number of pattern appearances substantially agrees with a sum total of products for all analysis candidates, the product being the number of pattern appearances in each analysis candidate syntactic tree and the analysis probability of the syntactic tree. The analysis probability P of each analysis candidate is represented as a function of the weights f(i, j) of dependency pairs included in an analysis candidate syntax tree. More specifically, the analysis probability P of each analysis candidate is expressed as a product of weights f(i, j) of dependency pairs included in an analysis candidate syntax tree, that is, expressed by an expression (3) below. In the expression (3) below, Z is a partition function and is a value of a total sum of products for all candidates, the product being the product of weights f for each analysis candidate. By dividing the product of weights f by a partition function Z, the total sum for all the candidates is 1 and can be used as a normalized analysis probability.

Expression 3

$$P(Y = y \mid X = x) = \frac{1}{Z}\{f(1, y_1) \times f(2, y_2) \ldots f(L, y_L)\} \quad (3)$$

In the second embodiment of the present invention, to determine a matching score is mathematically to determine a value expressed by an expression (4) below. Regarding the expression (4), the weight f(i, j) is given in this embodiment, unlike the first embodiment. The outside part is not the max function of the first embodiment but a sum total $\Sigma$ for a matching string m, and the partition function Z is calculable. Therefore, it is possible to directly calculate a possibility P without approximation although it is not possible to determine a matching string m which gives the highest score. Furthermore, since the outside part is the sum total $\Sigma$ for m, probabilities P corresponding to events of a query pattern appearing in analysis candidates are added. As a result, a sum total of products is determined, the product being the product of the number of appearances of the query pattern in each analysis candidate and the analysis probability of the analysis candidate.

Expression 4

$$\sum_m \left\{ \sum_{y\ s.t.\ V(y,p,m)=1} P(Y = y \mid X = x) \right\} \quad (4)$$

The score calculation unit 220 is provided with left and right sequence functions 222 and 224, left and right link functions 226 and 228, and left and right matching function 230 and 232. By recursively calling the group of these functions, the score calculation unit 220 calculates the expected value of the number of pattern appearances without enumerating all analysis candidates. More specifically, the score calculation unit 220 attempts association between a substructure of the query pattern 260 and a range in the analysis target sentence 250 using the group of multiple functions 222 to 232, and recursively calculates a partial calculation result of a sum of products for events of query pattern appearance inside the substructure and the range. Similarly to the first embodiment, the partial calculation result once obtained is stored in a dynamic programming table 234. When the partial calculation result is needed again in the calculation process, the value stored in the dynamic programming table 234 is reused instead of calculating it again. In the second embodiment, the structure of the pattern is recursively followed in the process of attempting association between a substructure of the query pattern 260 and a range in the analysis target sentence 250. In the process of attempting association in the second embodiment, the structure of the pattern is recursively followed while the structure of an analysis target sentence is recursively followed.

The output unit 240 outputs a calculation result 280 including an expected value of the number of pattern appearances (a matching score) calculated by the score calculation unit 220. In the second embodiment, since a sum total for the matching string m is calculated, the matching string m is not determined, and only the expected value of the number of pattern appearances is included in the calculation result 280.

Figure 19:
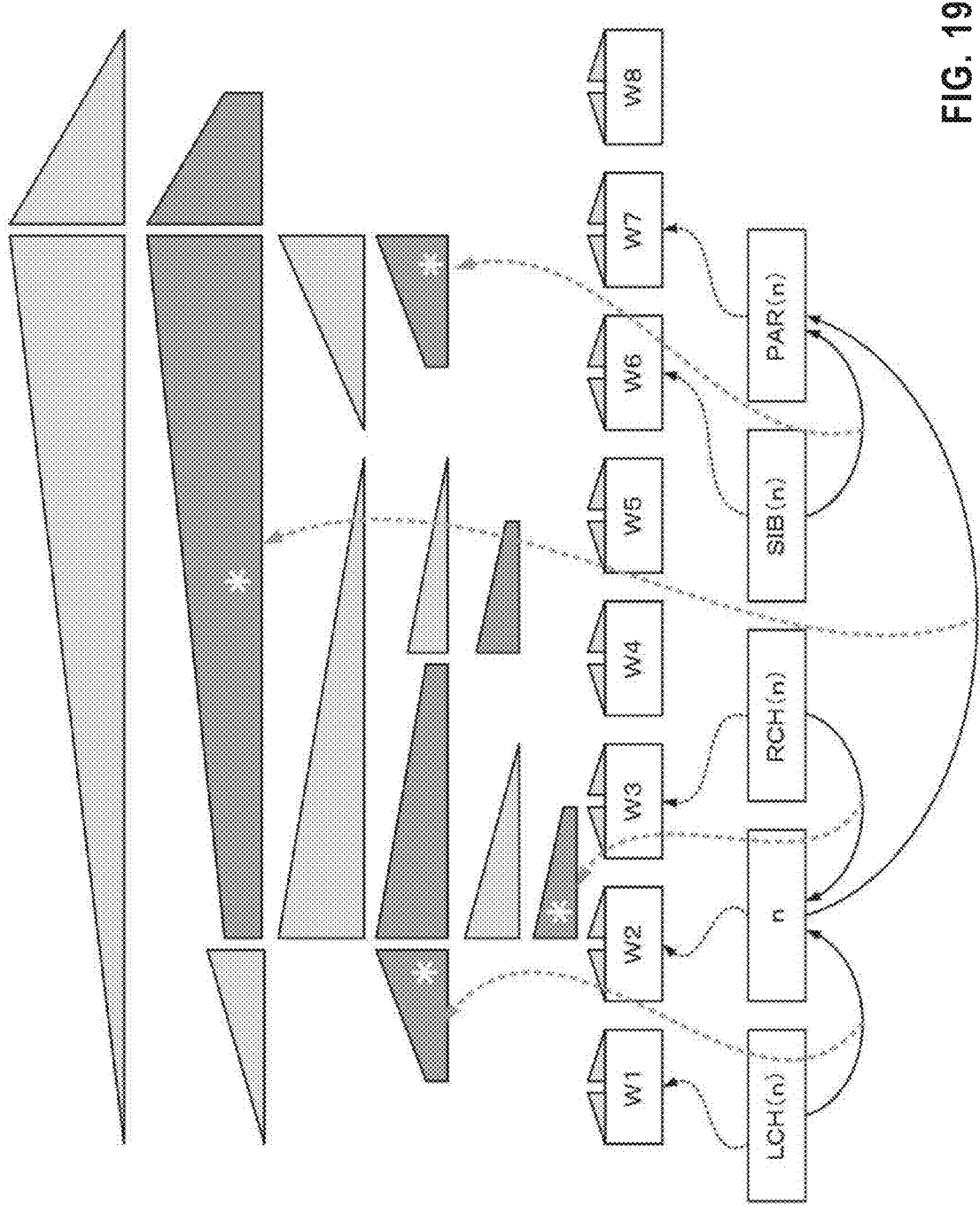
FIG. 19 is a conceptual diagram illustrating a matching score calculation method according to the second embodiment of the present invention.

A matching score calculation process according to the second embodiment of the present invention will be described below with reference to FIGS. 19 to 23. FIG. 19 is a diagram conceptually illustrating a matching score calculation method according to the second embodiment of the present invention. In the second embodiment of the present invention, a syntax tree similar to the Eisner syntax tree is considered for an analysis target sentence. Triangles and trapezoids in FIG. 19 correspond to a complete span and an incomplete span, respectively, in the linear Eisner algorithm. Furthermore, a trapezoid attached with "*" in FIG. 19 indicates a dependency relation on a syntax tree of a sentence associated with a dependency relation specified in a query pattern. FIG. 19 shows an example of a syntax tree as a syntax analysis result. Actually, however, a sum total of matching scores is calculated for all syntax analysis results.

In the second embodiment of the present invention, the dynamic programming is applied to both of a query pattern and an analysis target sentence to construct an analysis target syntax tree as well as attempting association between a substructure of the query pattern and a range in the analysis target sentence. The score calculation unit 220 starts by associating the root node (the whole structure) of a query pattern with the root node (the whole range) of the syntax tree of a sentence described above. First, a left-pointing triangle representing the whole structure of the query pattern is associated once with the range from the beginning to the end of the analysis target sentence, and association is performed sequentially beginning with the nearest left child node LCH(root) of the root node of the query pattern.

In an embodiment of the present invention, the left-pointing triangles and right-pointing triangles correspond to the left sequence function 222 and the right sequence function 224 shown in FIG. 18; the left-pointing trapezoids and right-pointing trapezoids without a symbol correspond to the left link function 226 and the right link function 228; and the left-pointing trapezoids and right-pointing trapezoids with the symbol "*" correspond to the left matching function 230 and the right matching function 232. In the score calculation process, the score calculation unit 220 recursively calls the group of the functions 222 to 232, attempts association between a substructure of the query pattern and a range in the analysis target sentence, gives a score represented by the weight (i, j) according to a dependency relation represented by the trapezoid, advances the process differently depending on whether the dependency relation of the query pattern is matched (with "*") or not matched (without the symbol), and calculates a matching score following both of the structure of the query pattern and the structure of the sentence.

The details of the sequence functions 222 and 224, the link functions 226 and 228, and the matching functions 230 and 232 used in the second embodiment of the present invention will be described below. FIG. 20 is a diagram illustrating the left sequence function in the second embodiment of the present invention. FIG. 21 is a diagram illustrating (A) the left link function and (B) the left matching function in the second embodiment of the present invention. FIG. 22 is a diagram illustrating pseudo-codes of (A) the left sequence function, (B) the left link function and (C) the left matching function in the second embodiment of the present invention. FIG. 23 is a diagram illustrating pseudo-codes of (A) the right sequence function, (B) the right link function and (C) the right matching function in the second embodiment of the present invention.

As shown in FIG. 20 and FIG. 22(A), the left sequence function 222 of the second embodiment is a function which receives the node n of the query pattern, the variable l representing a start position of a range in an analysis target sentence and the variable r representing an end position as arguments, and outputs a sum total of products, the product being a product of weights in the range in the sentence when:
(1) the parent node PAR(n) corresponds to the r-th segment,
(2) the end of left descendants of PAR(n) on a syntax tree of the sentence is l, and therefore, n and its descendants exist within the range of l, ..., r−1, and
(3) the node of interest n exists on the left side of PAR(n).

That is, the left sequence function 222 is a function which associates, in relation to the node of interest n, a substructure between the end of the left descendants of the parent node PAR(n) of the node of interest n and the parent node PAR(n) with a range in the sentence specified by the variable l and the variable r.

In order to make a search through a structure inside the substructure of the query pattern and the structure inside the range in the sentence, the left sequence function 222 attempts association of the nearest left child node of the parent node PAR(n) on the syntax tree of the sentence (the nearest left child node may match the node of interest n on the pattern or may not match it) with any position in l, ..., r−1 on the basis of the condition (2) described above. When an attempt position is represented by the variable i, association of a dependency relation from the nearest left child node of the parent node PAR(n) to the parent node PAR(n) is attempted at the position between the segments of the pair of the i-th→r-th segments, and the weight f(i, r) is given. It should be noted that the attempt position i stated here is not the position of the nearest left child node on the query pattern but the position of the nearest left child node of the parent node PAR(n) on the syntax tree of the sentence (when the node of interest n is matched, the nearest left child node on the pattern is also matched).

Figure 20A:
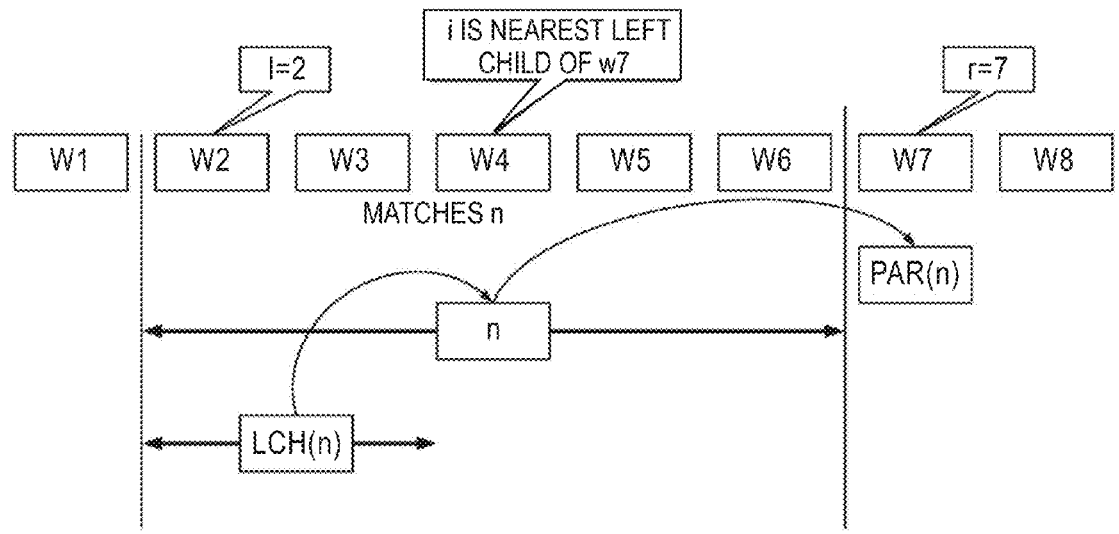
FIG. 20 is a diagram illustrating the left sequence function in the second embodiment of the present invention.

If the node of interest n matches a segment $x_i$ with which the nearest left child node of the parent node PAR(n) is associated (FIG. 20(A)), the nearest right child node RCH(n) of the node of interest n and its descendants, and SIB(n) and its descendants can exist within the range of i+1, ..., r−1 on the basis of the "projective" condition. Therefore, the left matching function 230, the details of which will be described later, is recursively called. At the same time, since the nearest left child node LCH(n) of the node of interest n and its descendants can exist within the range of l, ..., i−1, LCH(n), the variable l and the variable i are given as arguments, and the left sequence function 222 is recursively called.

Figure 20B:
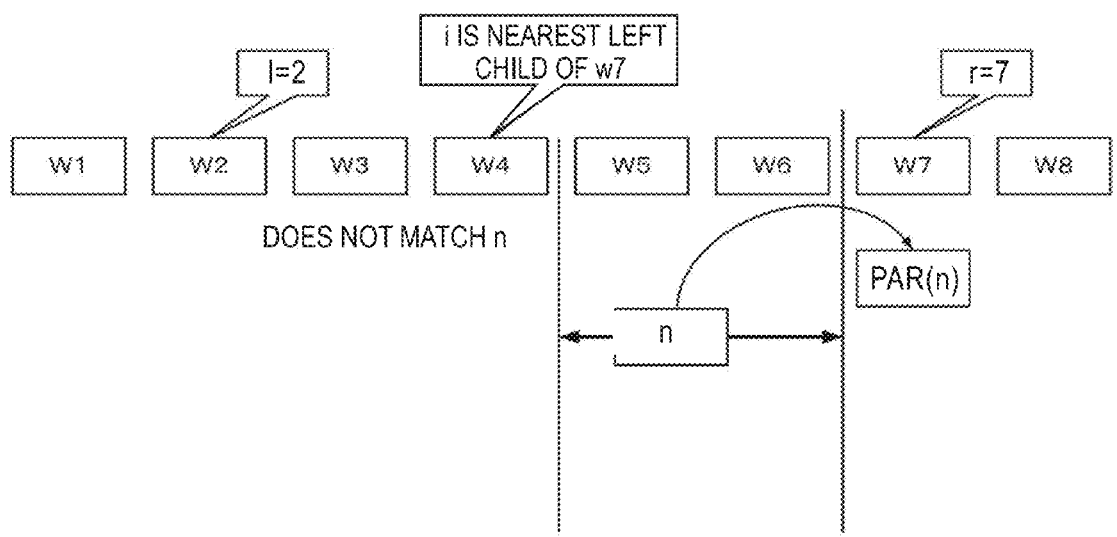

On the other hand, if the node of interest n does not match the segment $x_i$ with which the nearest left child node of the parent node PAR(n) is associated (FIG. 20(B); including the case of not making the node of interest n match the segment), the node of interest n and its descendants can exist within the range of i+1, ..., r−1. Therefore, the left link function 226, the details of which will be described later, is recursively called. There is not a pattern element corresponding to the remainder. Therefore, as for the range of l, ..., i−1, null, the variable l and the variable are given as arguments, and the left sequence function 222 is called.

As the pseudo-code shown in FIG. 22(A), for each attempt position i that the node of interest n matches, a left sequence function left_seq_e( ) advances to the next substructure inside the structure of a query pattern of interest and recursively calls the left sequence function 222 and the left matching function 230 attempting association, for the left half and right half ranges of the attempt position i. The left sequence function left_seq_e( ) calculates the product of each partial calculation result returned from the left sequence function 222 and the left matching function 230 called recursively and the given weight f(i, r) described above, and adds the product to a partial score. In this embodiment, for each attempt position i, the left sequence function left_seq_e( ) further gives null and calls the left sequence function 222, for the left-half range of the attempt position i, and recursively calls, for the right-half range of the attempt position i, the left link function 226 which attempts association with the same substructure-of-interest of the query pattern. For each attempt position i, the left sequence function left_seq_e( ) calculates the product of a partial calculation result (which is 1) returned from the left sequence function 222, a partial calculation result returned from the left link function 226 is recursively called, and the given weight f(i, r) described above, adds it to the partial score and returns it to the call source as a partial calculation result.

Figure 21A:
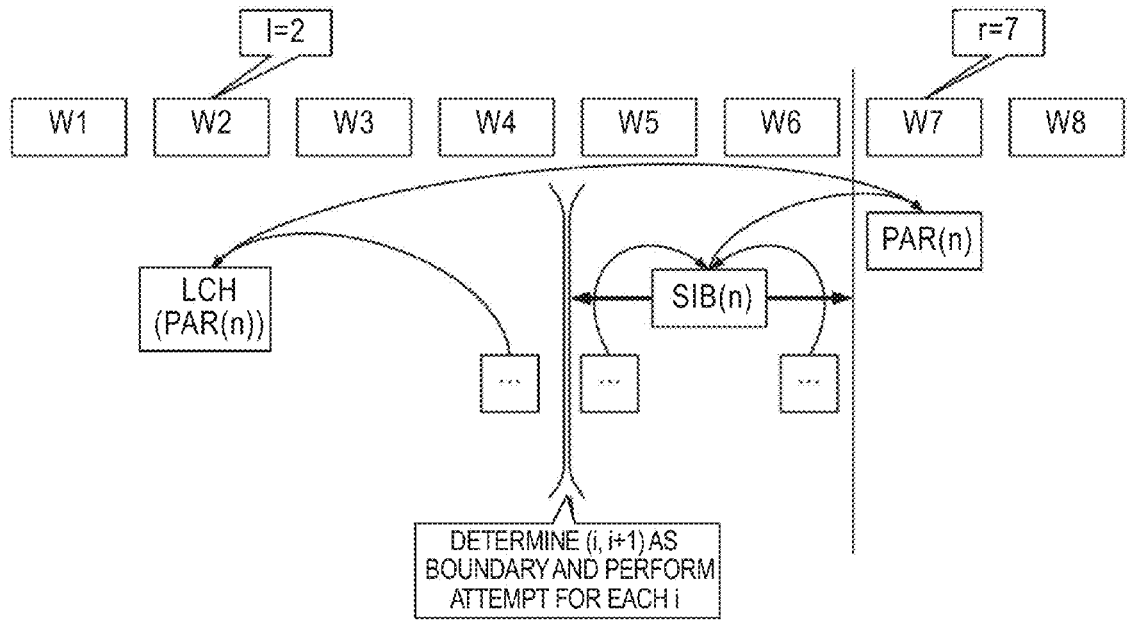
FIG. 21 is a diagram illustrating (A) the left sequence function and (B) a left link function in the second embodiment of the present invention.

As shown in FIG. 21(A) and FIG. 22(B), the left link function 226 is a function which receives the node n of the query pattern, the variable l representing a start position of a range in an analysis target sentence and the variable r representing an end position as arguments, and outputs a sum total of products, the product being a product of weights in the range in the sentence when:
(1) the parent node PAR(n) corresponds to the r-th segment,
(2) the nearest left child node of PAR(n) on the syntax tree of the sentence corresponds to the l-th segment and does not match the node of interest n,
(3) right descendants of the nearest left child node (the l-th segment) of the PAR(n) on the syntax tree of the sentence and the sibling of the nearest left child node exist the range of l+1, ..., r−1 on the basis of the "projective" condition, and
(4) the node of interest n exists on the left side of PAR(n).

That is, the left link function 226 is a function which associates, in relation to the node of interest n, a substructure between the left-side end of the nearest left child node of the parent node PAR(n) and the parent node PAR(n) with a range in the sentence specified by the variable l and the variable r.

Right descendants of the nearest left child node and descendants of the sibling node of the nearest left child node are adjacent to each other on the basis of the "projective" condition. Therefore, the left link function 226 attempts to set a boundary between the right-side end of the right descendants of the nearest left child node and the left-side end descendant of the sibling node of the nearest left child node at the position (i, i+1).

Then, because the descendants of the sibling of the nearest left child node can exist in i+1, ..., r−1, the left link function 226 associates the node of interest n with the range, and it gives the node of interest n, the variable i+1 and the variable r as arguments and recursively calls the left sequence function 222. On the other hand, the right descendants of the nearest left child node can exist in l+1, ..., i−1, but there is not a node of the query pattern to be associated with the range. Therefore, null, the variable l and the variable i are given as arguments, and the right sequence function 224 is called. Like the pseudo-code shown in FIG. 22(B), the left link function left_link_e( ) calculates, for each attempt position i, the product of a partial calculation result of the right sequence function 224 and a partial calculation result returned from the left sequence function 222 recursively called, adds it to a partial score, and returns it to the call source as a partial calculation result.

Figure 21B:
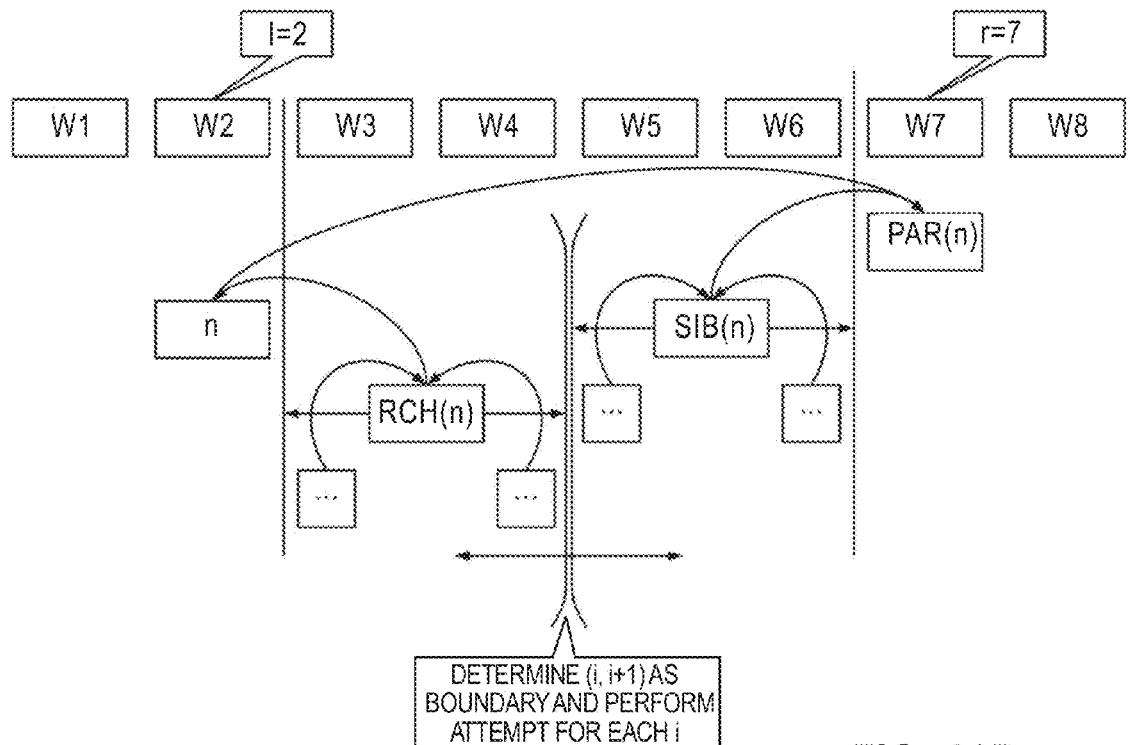

As shown in FIG. 21(B) and FIG. 22(C), the left matching function 230 is a function which receives the node n of the query pattern, the variable l representing a start position of a range in an analysis target sentence and the variable r representing an end position as arguments, and outputs a sum total of products, the product being a product of weights in the range in the sentence when:
(1) the parent node PAR(n) corresponds to the r-th segment,
(2) the nearest left child node of PAR(n) on the syntax tree of the sentence corresponds to the l-th segment and matches the node of interest n,
(3) right descendants of the nearest left child node of PAR(n) on the syntax tree of the sentence and the sibling of the nearest left child node exist in the range of l+1, ..., r−1 on the basis of the "projective" condition, and
(4) the node of interest n exists on the left side of PAR(n).

That is, the left matching function 230 is a function which associates, in relation to the node of interest n, a substructure between the left-side end of the node of interest n and the parent node PAR(n) with a range in a sentence specified by the variable l and the variable r.

Right descendants of the nearest left child node and descendants of the sibling node of the nearest left child node are adjacent to each other on the basis of the "projective" condition. Therefore, the left matching function 230 attempts to set a boundary between the end of the right descendants of the nearest left child node and the left-side end descendant of the sibling node of the nearest left child node at the position (i, i+1). Then, because the right descendants of the nearest left child node can exist in l+1, ..., i, the left matching function 230 associates the nearest right child node RCH(n) with the range, and it gives the nearest right child node RCH(n), the variable l and the variable i as arguments and recursively calls the right sequence function 224. At the same time, because the descendants of the sibling of the nearest left child node can exist in i+1, ..., r−1, the left matching function 230 associates the sibling node SIB(n) with the range, and it gives the sibling node SIB(n), the variable i+1 and the variable r as arguments and recursively calls the left sequence function 222. Like the pseudo-code shown in FIG. 22(C), the left matching function left_match_e( ) calculates, for each attempt position i, the product of a partial calculation result returned from the right sequence function 224 and left sequence function 222 which have been recursively called, adds it to a partial score, and returns it to the call source as a partial calculation result.

Regarding the right sequence function 224, the right link function 228 and the right matching function 232, their pseudo-codes are shown in FIG. 23 (A), (B) and (C), respectively, and they can be easily understood from the description about the left sequence function 222, the left link function 226 and the left matching function 230 made above or the description of the first embodiment. Therefore, detailed description thereof will be omitted.

Figure 24:
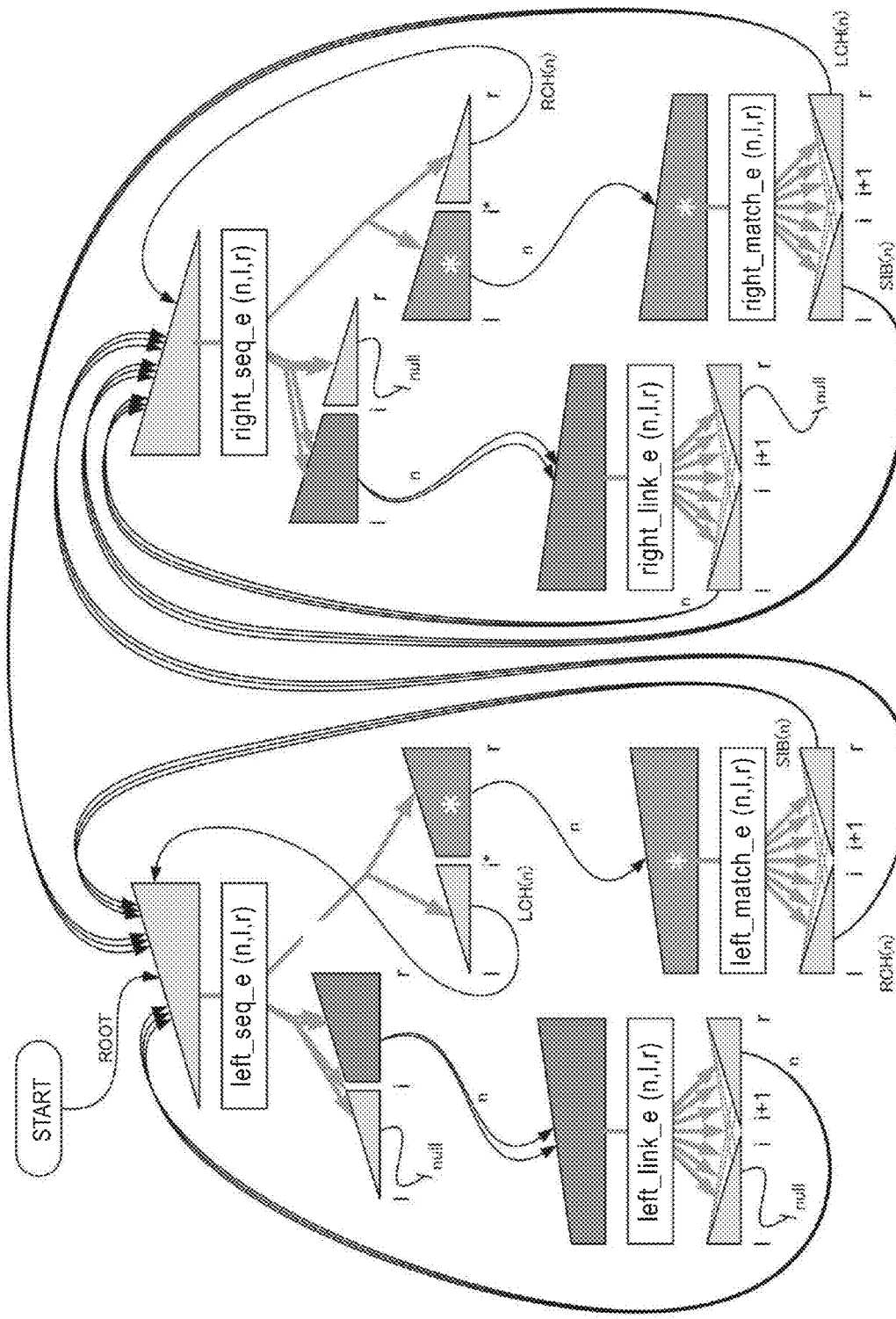
FIG. 24 is a diagram illustrating mutual recursive calls among the right and left sequence functions, the right and left link functions, and the right and left matching functions according to the second embodiment of the present invention.

FIG. 24 is a diagram illustrating mutual recursive calls among the right and left sequence functions, right and left link functions, and right and left matching functions described above. The matching score calculation process starts by the left sequence function left_seq_e( ) being called from the main routine, with the root node (representing the whole structure) of the syntax tree of a query pattern and the whole range of an analysis target sentence as arguments.

In the case of matching a node n, the left sequence function left_seq_e(n, l, r) divides the range of (l, ..., r) for which association is currently being performed at each attempt position i* that matches the node n, recursively calls a forward-direction left sequence function left_seq_e(LCH(n), l, i) for the left-half range (l, ..., i) on the side opposite to the parent, and recursively calls a forward-direction left matching function left_match_e(n, i, r) for the right-half range (i, ..., r) on the parent side. Furthermore, in the case of not matching the node n, the left sequence function left_seq_e(n, l, r) divides a range (l, ..., r) for which association is currently being performed at each attempt position i, recursively calls a forward-direction left sequence function left_seq_e(null, l, i) for the left-half range (l, ..., i) on the side opposite to the parent, and recursively calls a forward-direction left link function left_link_e(n, i, r) for the right-half range (i, ..., r) on the parent side.

The left link function left_link_e(n, l, r) divides a range (l, ..., r) for which association is currently being performed at each attempt position i, recursively calls an opposite-direction right sequence function right_seq_e(null, l, i) for the left-half range (l, ..., i) on the side opposite to the parent, and recursively calls a forward-direction left sequence function left_seq_e(n, i+1, r) for the right-half range (i+1, ..., r) on the parent side. On the other hand, the left matching function left_match_e(n, l, r) divides a range (l, ..., r) for which association is currently being performed at each attempt position i, recursively calls an opposite-direction right sequence function right_seq_e(RCH(n), l, i), for the left-half range (l, ..., i) on the side opposite to the parent, and recursively calls a forward-direction left sequence function left_seq_e (SIB(n), i+1, r) for the right-half range (i+1, ..., r) on the parent side.

In the case of matching the node n, the right sequence function right_seq_e(n, l, r) divides a range at each attempt position i* that matches the node n, recursively calls a forward-direction right matching function right_match_e(n, l, i) for the left-half range (l, ..., i) on the parent side, and recursively calls a forward-direction right sequence function right_seq_e(RCH(n), i, r) for the right-half range (i, ..., r) on the side opposite to the parent. Furthermore, in the case of not matching the node n, the right sequence function right_seq_e (n, l, r) divides a range (l, ..., r) at each attempt position i, recursively calls a forward-direction right link function right_link_e(n, l, i) for the left-half range (l, ..., i) on the parent side, and recursively calls a forward-direction right sequence function right_seq_e(null, i, r) for the right-half range (i, ..., r) on the side opposite to the parent.

The right link function right_link_e(n, l, r) divides a range (l, ..., r) at each attempt position i, recursively calls a forward-direction right sequence function right_seq_e(n, l, i) for the left-half range (l, ..., i) on the parent side, and recursively calls an opposite-direction left sequence function left_seq_e(null, i+1, r) for the right-half range (i+1, ..., r) on the side opposite to the parent. The right matching function right_match(n, l, r) divides the current range at each attempt position i, recursively calls a forward-direction right sequence function right_seq_e(SIB(n), l, i) for the left-half range (l, ..., i) on the parent side, and recursively calls an opposite-direction left sequence function left_seq_e(LCH (n), i+1, r) for the right-half range (i+1, ..., r) on the side opposite to the parent.

By mutually performing recursive calls as shown in FIG. 24, a syntax tree of an analysis target sentence is constructed; association for the whole structure of a query pattern down to an end node is performed; and an expected value of the number of pattern appearances is calculated which is a sum total of products, the product being a product of the number of appearances of the query pattern in each syntax tree and its analysis probability while the number of the events of the query pattern appearing in the syntax tree is counted up. The obtained product of weights f (i, j) cannot be treated as a probability as it is, because it is not normalized. Therefore, it is preferable to process the product of weights f(i, j) into such a form that it can be treated as a probability by dividing it by a sum total Z of unnormalized probabilities of all analysis candidates which are simultaneously determined in the matching score calculation process.

According to the second embodiment described above, it is possible to efficiently calculate an expected value of the number of pattern appearances which indexes the degree of matching of a sentence with a query pattern having a dependency structure, without approximation. As described above, the "expected value of the number of pattern appearances" is an expected value of the number of appearances of a pattern in all analysis candidates and agrees with a sum total of products for all the analysis candidates, the product being a product of the number of pattern appearances in each analysis candidate and its analysis probability. Therefore, it is conventionally necessary to enumerate all the analysis candidates, extract syntax tree candidates that match the query pattern by pattern matching and count the number of times matching occurs, and determine a sum total of products for the candidates, the product being a product of the analysis probability and the number of times of matching of each candidate. In this case, the number of analysis candidates increases exponentially according to the sentence length, and it is quantitatively difficult and not realistic to do so.

In comparison, in the computer apparatus 200 according to the second embodiment of the present invention, it is possible to efficiently calculate an expected value of the number of pattern appearances without enumerating all analysis candidates and without approximation, by representing the probability of an analysis candidate by a function in proportion to the product of weights given between segments of segment pairs in the analysis target sentence and applying the dynamic programming. In the score calculation process to which the dynamic programming is applied, according to the second embodiment of the present invention, a group of functions is recursively called which attempts association between a substructure of a query pattern and a range in an analysis target sentence and simultaneously makes a search through the structure of the analysis target sentence, the partial calculation result is recursively calculated for the inside of the substructure of the query pattern and the range in the sentence, and thereby, an expected value of the number of pattern appearances is determined. As for the amount of calculation, since the dynamic programming can be applied, and the calculation cost can be exchanged with the storage cost, it is only approximately $O(L^3M)$, in which L and M denote the sentence length and the pattern size, respectively. A process for calculating a matching score of an analysis target sentence has been described. However, similar to the first embodiment, it is also possible to incorporate the matching score calculation process and perform information search and information extraction in consideration of a dependency structure.

EXPERIMENTS

1. Implementation on Computer

A computer system was implemented on which the matching score calculation program according to the first embodiment of the present invention was implemented, with the use of a multi-core processor (Intel®Core™2 Duo) with the number of clocks oat 3.0 GHz and ThinkStation® provided with 2 GB of RAM. The operating system of this computer system was Windows XP®. The above program was written in the Java® programming language.

2. Result of Experiment 2.1. Experiment Example 1 and Comparison Example 1

Figure 25:
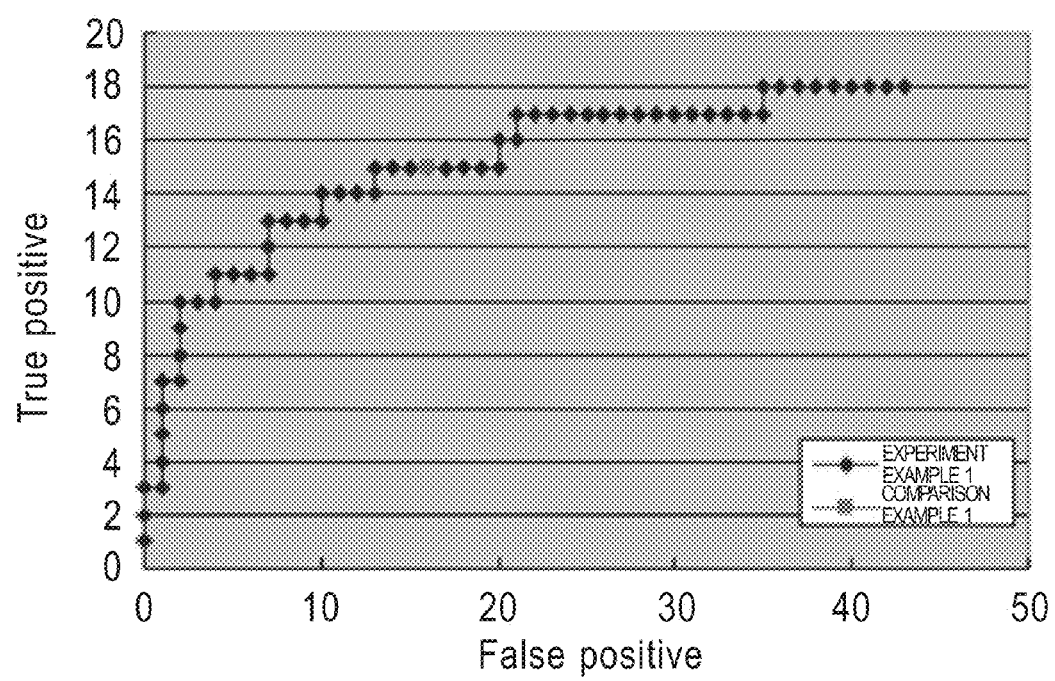
FIG. 25 is an ROC graph showing a result of an experiment example 1 and a result of a comparison example 1 by a 1-best method.

The Mainichi Newspapers 1995 data was used as analysis target data, and "Shusho . . . hatsugen . . . [verb]" (meaning that "Shusho" ("prime minister") and "hatsugen" ("statement") modify [verb]) was used as a query pattern. The matching score calculation program was applied to each sentence of the analysis target data with the use of the marginal probability of pattern as a matching score. Sorting was performed in descending order of the matching score, and the number of false-positives and the number of true-positives for the top k sentences were plotted to create an ROC (Receiver Operating Characteristic) graph. FIG. 25 shows the result of the experiment example 1 and the result of the comparison example 1 by the 1-best method.

As shown in FIG. 25, for 18 correct results given manually, 3 correct results could not be detected due to analysis errors, only 15 correct results were detected, and 16 results were erroneously detected in the comparison example by the 1-best method. In comparison, in the experiment example 1, all the correct results could be included among the top 51 results, and 10 correct results could be included among the top 12 results (approximately 80%), which shows a high recall.

2.2. Experiment Example 2 and Comparison Examples 2 to 4

Figure 26A:
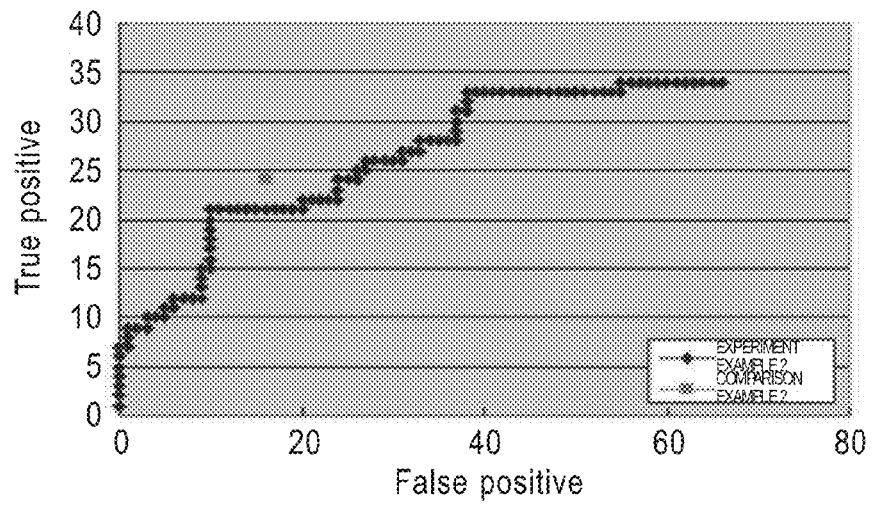
FIG. 26 is an ROC graph showing a result of an experiment example 2 and a result of comparison examples 2 to 4 by the 1-best method.
Figure 26B:
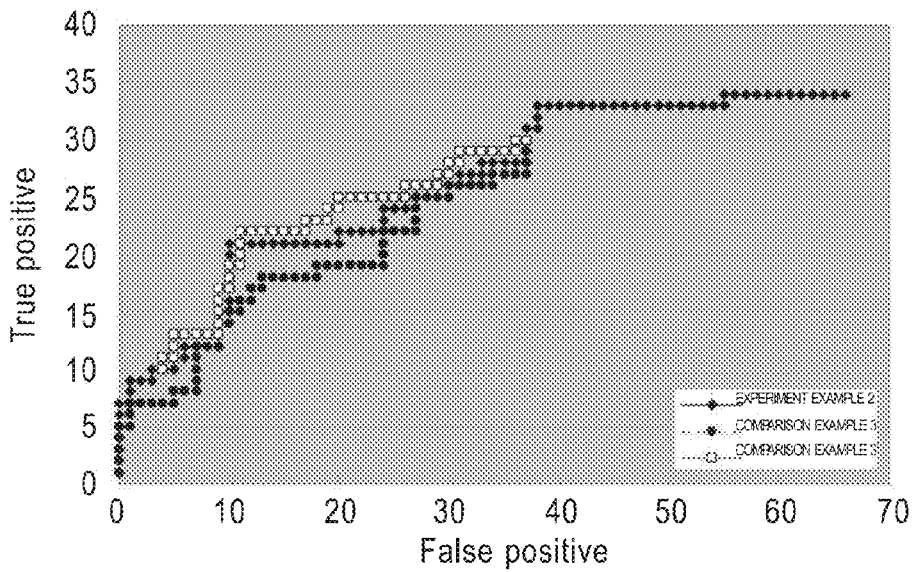
Figure 26C:
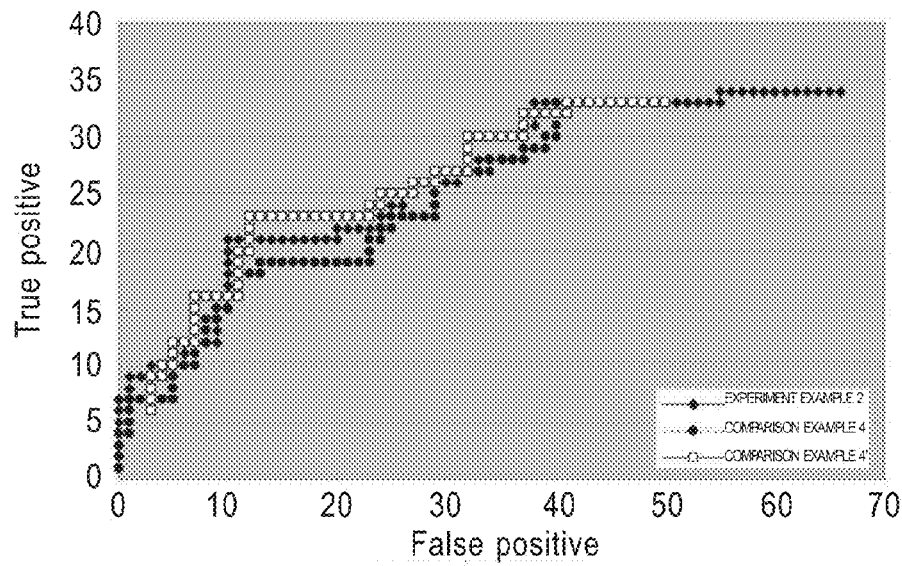

Similarly, the Mainichi Newspapers 1995 data was used as analysis target data, and "Shusho . . . senkyo . . . [verb]" (meaning that "Shusho" ("prime minister") and "senkyo" ("election") modify [verb]) was used as a query pattern. The matching score calculation program was applied to each sentence of the analysis target data with the use of the marginal probability of pattern as a matching score. Sorting was performed in descending order of the matching score, and the number of false-positives and the number of true-positives for the top k sentences were plotted to create an ROC graph. FIG. 26(A) shows the result of the experiment example 2 and the result of the comparison example 2 by the 1-best method. FIG. 26(B) shows the result of the experiment example 2 and the result of the comparison example 3 by a 5-best method. FIG. 26(C) shows the result of the experiment example 2 and the result of the comparison example 4 by a 10-best method. In the case of matching of a simple character string, 302 hits were obtained under the above conditions. In the N-best method, matching was performed with each of outputted N syntax trees, and the sum total of scores of matched syntax trees was determined to be a matching score. Furthermore, what was obtained by dividing the matching score by the N-best method by the sum total of the scores of the N syntax trees and normalizing the result is shown by comparison example 3' and 4'.

As shown in FIG. 26, among 34 correct results given manually, 10 could not be detected due to analysis errors, only 24 correct results were detected, and 16 erroneous results were detected in the comparison example 2 by the 1-best method. In the comparison example 3 by the 5-best method, 4 correct results were not found. In the comparison example 4 by the 10-best method, 1 correct result was not found. In comparison, in the experiment example 2, all the correct results could be included among the top 55 results.

2.3. Experiment Example 3 and Comparison Examples 5 to 7

Figure 27A:
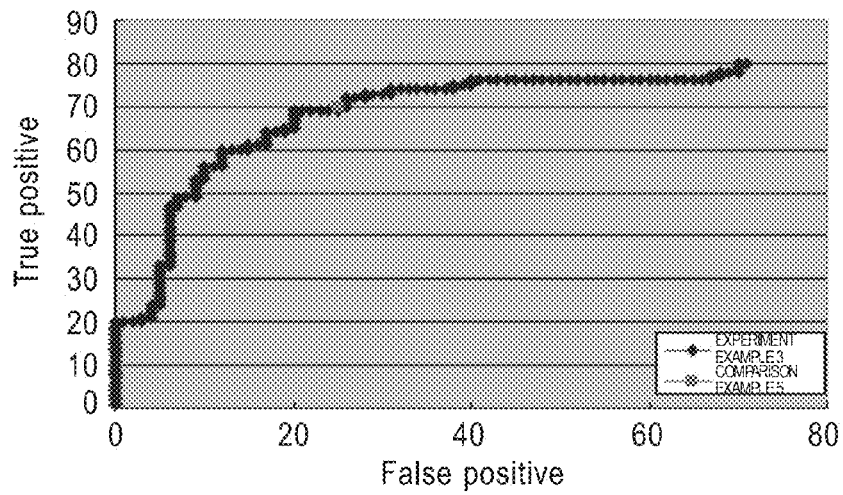
FIG. 27 is an ROC graph showing a result of an experiment example 3 and a result of comparison examples 5 to 7 by the 1-best method.
Figure 27B:
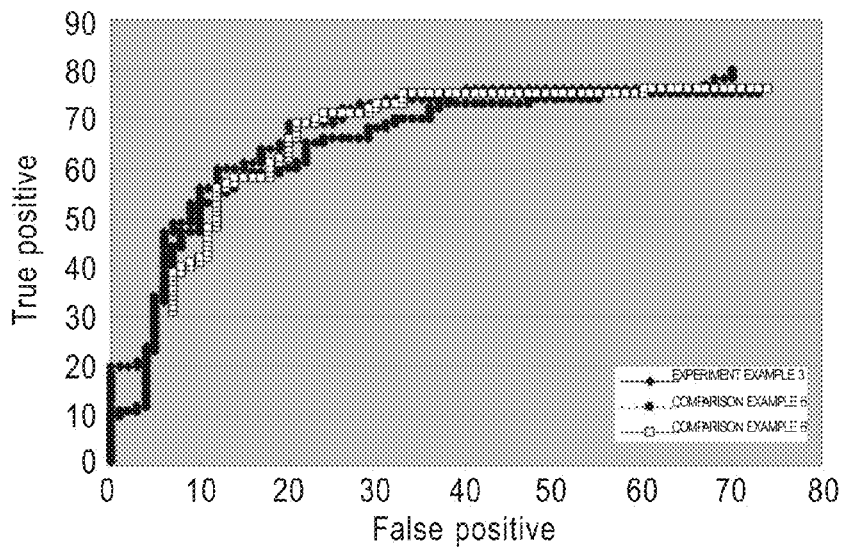
Figure 27C:
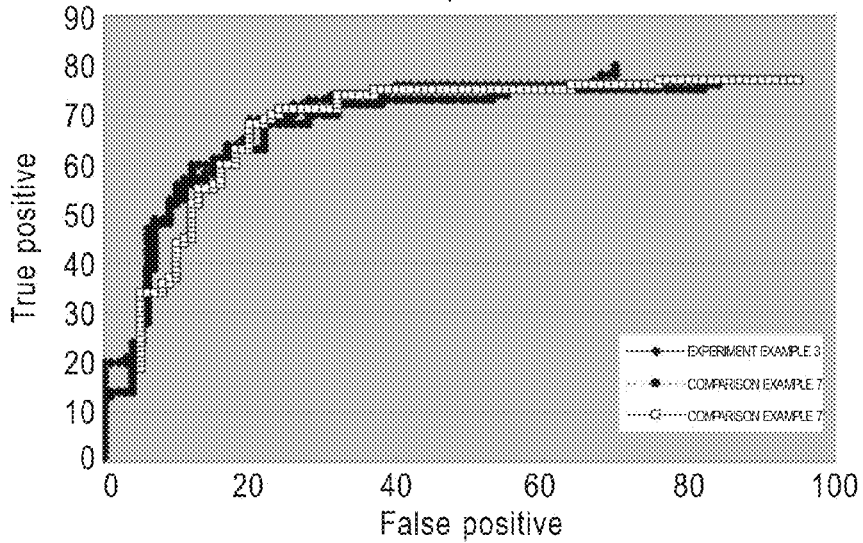
Figure 28A:
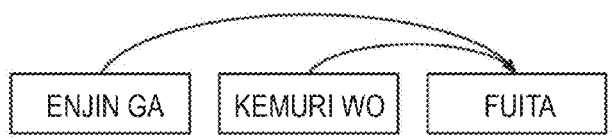
FIG. 28 is a diagram illustrating matching of a syntax analysis result according to a prior-art technique.
Figure 28B:
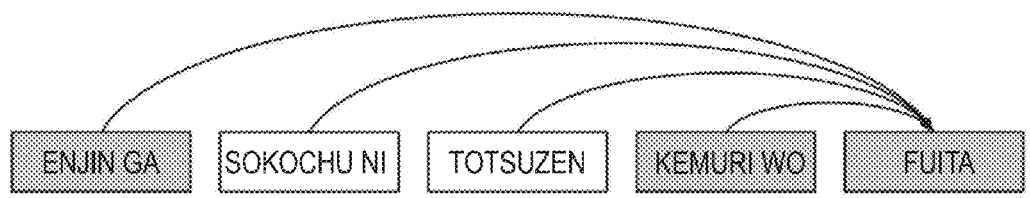
Figure 28C:
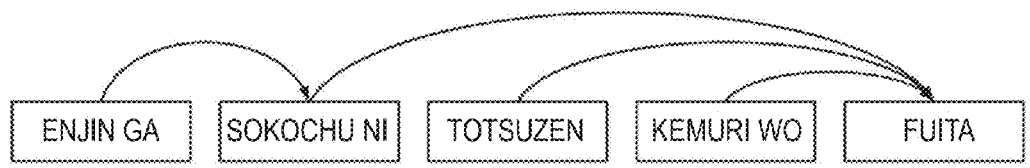

Similarly, the Mainichi Newspapers 1995 data was used as analysis target data, and "Shusho ( . . . no . . . ni) . . . wo . . . [verb]" (meaning that " . . . no" modifies "to . . . ", and that "Shusho" ("the prime minister"), " . . . ni" and " . . . wo" modify [verb]) was used as a query pattern. The matching score calculation program was applied to each sentence of the data with the use of the marginal probability of pattern as a matching score. Sorting was performed in descending order of the matching score, and the number of false-positives and the number of true-positives for the top k sentences were plotted to create an ROC graph. FIG. 27(A) shows the result of the experiment example 3 and the result of the comparison example 5 by the 1-best method. FIG. 27(B) shows the result of the experiment example 2 and the result of the comparison example 6 by the 5-best method. FIG. 27(C) shows the result of the experiment example 2 and the result of the comparison example 7 by the 10-best method. In the case of matching of a simple character string, 2054 hits were obtained. What is obtained by normalizing the matching scores of the comparison examples 6 and 7 by the N-best method is shown by comparison examples 6' and 7'.

As shown in FIG. 27, among 80 correct results given manually, 10 correct results could not be detected due to analysis errors, only 70 correct results were detected, and 25 results were erroneously detected in the comparison example 5 by the 1-best method. In the comparison example 6 by the 5-best method, 4 correct results were not found. In the comparison example 7 by the 10-best method, 2 correct results were not found. In comparison, in the experiment example 3, all the 80 correct results could be included among the top 149 results. Furthermore, although 4 results among 20 results were erroneous in the comparison example 5 by the 1-best method, all of the top 20 results were correct in the experiment example 3. At a higher side, a higher correct-result rate was obtained in comparison with the 5-best and the 10-best methods. When normalization was performed, the scores at higher positions are normalized to 1 in both of comparison examples 6' and 7', and ranking was impossible.

From the experiment results shown in FIGS. 25 to 27, it is shown that, in the matching score calculation process of the present invention, the recall is higher in comparison with the case of using the conventional 1-best method or the N-best method, and that it is possible to adjust the recall and the precision. It is shown that the scores of search results are scattered, and that it is possible to preferably adjust the recall and the precision.

As described above, according to the embodiments of the present invention, it is possible to provide an information processing apparatus capable of calculating a score of matching a sentence with a query pattern having a dependency structure without enumerating syntax analysis candidates of the sentence, adjusting the precision and the recall in information search and information extraction at a desired level and, therefore, realizing high robustness against syntax analysis errors, a natural language analysis method, a program and a recording medium.

Each functional unit and the process by each functional unit have been described in relation to the present invention to make it easy to understand the invention. In the present invention, however, in addition to the particular functional units described above executing the particular processes, it is possible to assign a function of executing any of the processes described above to any functional unit, in consideration of the processing efficiency or the efficiency of programming for implementation.

The present invention is applicable to languages other than Japanese and English as described above, such as Chinese, Arabic, German, French, Russian and Korean.

The functions of the present invention can be realized by an apparatus-executable program written in an object-oriented programming language such as C++, Java®, Java® Beans, Java® Applet, Java® Script, Perl, Python and Ruby, and can be stored in an apparatus-readable recording medium and distributed, or can be distributed by transmission. It can be realized as a computer program product with a computer readable storage medium having computer readable non-transient program code embodied therein The present invention has been described with particular embodiments. The present invention, however, is not limited to the embodiments and can be changed within a range that one skilled in the art can assume, by another embodiment, addition, dependency, deletion or the like. Any of these aspects are to be included in the scope of the present invention as far as the operation and advantages of the present invention are obtained.

What is claimed is:

1. A natural language analysis method for calculating a score of matching of a sentence written in a natural language with a pattern having a dependency structure, the method comprising:
  receiving as inputs a sentence to be analyzed, an index value indexing how a linguistic unit in said sentence tends to modify another, and a query pattern;
  storing said inputs in a storage area; and
  calculating a matching score indexing the degree of matching of said sentence with said query pattern by a processor, said matching score being represented by a function having at least a variable, said variable being an index value with which a dependency relation included in said query pattern is associated; wherein
  said calculating comprises a step of recursively calling a substep of attempting association between a substructure of said query pattern and a range in said sentence and performing a calculation while storing a partial calculation result of said function in a memory area for reusing said result, in said substructure and said range.

2. The natural language analysis method according to claim 1, wherein:
  said function representing said matching score is a function that includes a product of the associated index values;
  said partial calculation result of said function is a partial score represented by said function that includes a product of index values associated with dependency relations in said substructure of said query pattern in a case where said substructure is associated with said range in said sentence; and
  said structure of said query pattern is followed by said recursive call step.

3. A computer program product for calculating a score of matching of a sentence with a pattern on a computer system, the computer program product comprising:
a computer readable storage medium having computer readable non-transient program code embodied therein, the computer readable program code comprising computer readable program code configured to perform the steps of a method according to claim 1.

4. A computer program product for calculating a score of matching of a sentence with a pattern on a computer system, the computer program product comprising:
a computer readable storage medium having computer readable non-transient program code embodied therein, the computer readable program code comprising computer readable program code configured to perform the steps of a method according to claim 2.

5. An information processing apparatus for calculating a score of matching a sentence with a pattern, the apparatus comprising:
an input unit receiving as inputs a sentence to be analyzed, an index value indexing how a linguistic unit in said sentence tends to modify another, and a query pattern; and
a score calculation unit calculating a matching score indexing the degree of matching of said sentence with said query pattern, said matching score being represented by a function having at least a variable, said variable being an index value with which a dependency relation included in said query pattern is associated;
wherein said score calculation unit calculates said score by attempting association between a substructure of said query pattern and a range in said sentence and performing recursive calculation in said substructure and said range while storing a partial calculation result of said function in a memory area for reusing said result.

6. The information processing apparatus according to claim 5, wherein:
said function representing said matching score includes a product of the associated index values;
said partial calculation result of said function is a partial score represented by said function, wherein said function includes a product of index values associated with dependency relations in said substructure of said query pattern at the time in a case where said substructure is associated with said range in said sentence; and
said score calculation unit follows the structure of said query pattern by said recursive calculation.

7. The information processing apparatus according to claim 6, wherein:
said index value is a marginal probability of dependency between said linguistic units in said sentence;
said matching score is a marginal probability of pattern of a candidate having said query pattern as a subtree being generated among analysis candidates of said sentence;
said function representing said matching score is a product of the associated marginal probabilities of dependency, and said function approximates said marginal probability of pattern;
said partial score is a local maximum value of a product of said marginal probabilities of dependency associated with the dependency relations in said substructure; and
said score calculation unit globally maximizes said marginal probability of pattern by said recursive calculation, following the structure of said query pattern.

8. The information processing apparatus according to claim 6, wherein:
said index value is a weight indexing how one linguistic unit in a language unit pair in said sentence tends to modify the other;
said matching score is an expected value of the number of pattern appearances that means an expectation that said query pattern appears as a subtree in analysis candidates of said sentence;
said function representing said matching score is a sum total of products for analysis candidates in which said query pattern appears, said product being a product of a probability of each analysis candidate in which said query pattern appears and the number of appearances, said probability of said analysis candidate being represented by normalizing a product of weights of dependency relations included in the analysis candidate;
said partial score is a sum total of products for association pairs inside said range in said sentence, said product being a product of the weights of each association pair; and
said score calculation unit calculates said expected value of the number of pattern appearances by counting up events of appearance of said query pattern by the recursive calculation while following the structure of said query pattern and the structure of said sentence, and adding the probability of the analysis candidate in which said query pattern appears.

9. The information processing apparatus according to claim 6, wherein:
said query pattern constitutes a tree structure including nodes to be matched with linguistic units and edges indicating dependency relations; and
said score calculation unit includes, as a group of functions for performing said recursive calculation, a first-type function of associating a substructure between an end of the descendants, on the side opposite of a parent of a first node of interest and the parent node in said query pattern with a first range in said sentence, and giving, for each attempt position at which said first node of interest is to be matched, the index value associated with a dependency relation from the attempt position to a position of said parent node as well as recursively calling said first-type function in a forward direction for a range on the side opposite to said parent, with the attempt position of said first range as a boundary to output said partial score for all the attempt positions.

10. The information processing apparatus according to claim 9, wherein:
said score calculation unit further includes, as the group of functions for performing said recursive calculation, a second-type function of associating a substructure between a second node of interest and a parent node in said query pattern with a second range in said sentence, recursively calling, for each attempt position separating descendants of a parent-side end child node and a sibling node of said second node of interest, said first-type function in an opposite direction for a range on the side opposite to said parent with the attempt position of said second range as a boundary and recursively calling said first-type function in the forward direction for a parent-side range to output a partial score for all the attempt positions; and
said first-type function recursively calls said forward-direction first-type function as well as recursively calling said second-type function in a forward direction for the parent-side range with the attempt position of said first range as a boundary.

11. The information processing apparatus according to claim 10, wherein:
said first-type function gives an end child node on the side opposite to said parent of said first node of interest when calling said forward-direction first-type function and gives said first node of interest when calling said forward-direction second-type function; and
said second-type function gives said parent-side end child node of said second node of interest when calling said opposite-direction first-type function and gives said sibling node of said second node of interest when calling said forward-direction first-type function.

12. The information processing apparatus according to claim 10, wherein:
said score calculation unit further includes, as the group of functions for performing said recursive calculation, a third-type function of associating a substructure between an end of descendants of a parent node of a third node of interest and said parent node in said query pattern with a third range in said sentence, recursively calling, for each attempt position separating an end of descendants on the side opposite to the parent of said third node of interest, said forward-direction first-type function for a parent-side range with the attempt position of said third range as a boundary to output a partial score for all the attempt positions; and
said first-type function recursively calls, for each attempt position in the case where said first node of interest does not match, said third-type function in a forward direction for said parent-side range with the attempt position of said first range as a boundary.

13. The information processing apparatus according to claim 12, wherein:
said first-type function gives an end child node on the side opposite to said parent of said first node of interest when calling said forward-direction first-type function and gives said first node of interest when calling said forward-direction second-type function;
said second-type function advances the process into said substructure of said query pattern, gives the parent-side end child node of said second node of interest when calling said opposite-direction first-type function and gives said sibling node of said second node of interest when calling said forward-direction first-type function; and
said third-type function does not advance the process into said substructure of said query pattern but gives said third node of interest when calling said forward-direction first-type function.

14. The information processing apparatus according to claim 9, wherein:
said group of functions includes left-direction functions such that a parent node of a node of interest is positioned on the right end of said substructure of said query pattern and right-direction functions such that said parent node of said node of interest is positioned on the left end of said substructure of said query pattern.

15. The information processing apparatus according to claim 5, wherein
said sentence to be analyzed is given as an element of a set of sentences that includes multiple sentences; and
said information processing apparatus further comprises an information search interface outputting such an element that a matching score acquired satisfies a search condition, among said elements of said set of sentences, as a search result in response to a search request.

16. The information processing apparatus according to claim 15, wherein said information search interface accepts said search condition.

17. The information processing apparatus according to claim 5, wherein:
said sentence to be analyzed is given as an element of a set of sentences that includes multiple sentences; and
said information processing apparatus further comprises a function unit determining and outputting a sum total of matching scores acquired for said elements of said set of sentences.

18. The information processing apparatus according to claim 5, wherein said sentence to be analyzed is at least one of a projective two-way and one-way sentence, and said query pattern is a subtree of a projective dependency tree.

19. An information processing apparatus for calculating a score of matching of a sentence with a pattern, the apparatus comprising:
an input unit receiving as inputs a sentence to be analyzed, a marginal probability of dependency between linguistic units, and a query pattern; and
a score calculation unit calculating a marginal probability of pattern of a candidate having the query pattern as a subtree being generated among analysis candidates of the sentence as the score, the marginal probability of pattern being represented by a function of the marginal probability of dependency with which each dependency relation specified in the query pattern is associated;
wherein the score calculation unit calculates the marginal probability of pattern by attempting association between a substructure of the query pattern and a range in the sentence and performing recursive calculation inside said substructure and said range while storing a partial calculation result of the function in a memory area for reusing the result.

20. The information processing apparatus according to claim 19, wherein:
said function representing said marginal probability of pattern is a product of said marginal probabilities of dependency, and said function approximates said marginal probability of pattern;
said partial calculation result of said function is a local maximum value of a product of marginal probabilities of dependency with which dependency relations in said substructure of said query pattern in a case where said substructure is associated with said range in said sentence are associated; and
said score calculation unit globally maximizes said marginal probability of pattern by said recursive calculation.

* * * * *